US008339500B2

(12) United States Patent
Hattori et al.

(10) Patent No.: US 8,339,500 B2
(45) Date of Patent: Dec. 25, 2012

(54) VIDEO SHARING SYSTEM, PHOTOGRAPHY SUPPORT SYSTEM, AND CAMERA

(75) Inventors: Yuko Hattori, Tokyo (JP); Junko Hasegawa, Atsugi (JP)

(73) Assignee: Nikon Corporation, Tokyo (JP)

( * ) Notice: Subject to any disclaimer, the term of this patent is extended or adjusted under 35 U.S.C. 154(b) by 327 days.

(21) Appl. No.: 12/310,674

(22) PCT Filed: Sep. 4, 2007

(86) PCT No.: PCT/JP2007/067217
§ 371 (c)(1),
(2), (4) Date: Mar. 4, 2009

(87) PCT Pub. No.: WO2008/029803
PCT Pub. Date: Mar. 13, 2008

(65) Prior Publication Data
US 2010/0002084 A1 Jan. 7, 2010

(30) Foreign Application Priority Data

Sep. 4, 2006 (JP) ................................ 2006-238977
Sep. 4, 2006 (JP) ................................ 2006-238978
Sep. 4, 2006 (JP) ................................ 2006-238979
Sep. 6, 2006 (JP) ................................ 2006-241579

(51) Int. Cl.
H04N 5/225 (2006.01)
H04N 5/232 (2006.01)
H04N 5/222 (2006.01)

(52) U.S. Cl. ............. 348/333.04; 348/207.1; 348/211.4; 348/211.9; 348/333.03

(58) Field of Classification Search ............. 348/207.99, 348/207.1, 207.11, 211.99, 211.4–211.6, 348/211.9, 211.11, 231.2, 231.3, 333.02–333.04, 348/333.12; 455/456.1, 456.3
See application file for complete search history.

(56) References Cited

U.S. PATENT DOCUMENTS

| 6,608,563 | B2 * | 8/2003 | Weston et al. ............. 340/573.1 |
| 7,355,632 | B2 * | 4/2008 | Shiiyama ................... 348/211.1 |
| 7,956,900 | B2 * | 6/2011 | Itoh ........................... 348/211.9 |
| 2002/0049728 | A1 | 4/2002 | Kaku |
| 2002/0085762 | A1 * | 7/2002 | Shniberg et al. ............. 382/224 |
| 2003/0103149 | A1 | 6/2003 | Kinjo et al. |
| 2004/0201683 | A1 | 10/2004 | Murashita et al. |
| 2004/0218058 | A1 | 11/2004 | Yamaguchi et al. |

FOREIGN PATENT DOCUMENTS

JP     A-09-074505     3/1997

(Continued)

OTHER PUBLICATIONS

English Translation, from WIPO, of International Preliminary Report on Patentability Chapter I for PCT/JP07/067217 issued Mar. 17, 2009.*

(Continued)

Primary Examiner — Daniel M Pasiewicz
(74) Attorney, Agent, or Firm — Oliff & Berridge, PLC

(57) ABSTRACT

A video sharing system, accumulating various videos and enabling a plurality of users to utilize these accumulated videos, includes a plurality of cameras that photograph any one of a plurality of photographic subjects present within a facility, a video collection unit that collects photographed videos photographed by the plurality of cameras, a photographic subject identification unit that identifies the photographic subjects in the photographed videos, for each photographed video; and an accumulation unit that accumulates the photographed videos collected by the video collection unit, and photographic subject information specifying the photographic subjects identified by the photographic subject identification unit.

6 Claims, 23 Drawing Sheets

FOREIGN PATENT DOCUMENTS

| | | |
|---|---|---|
| JP | A-2002-010250 | 1/2002 |
| JP | A-2002-024229 | 1/2002 |
| JP | A-2002-297753 | 10/2002 |
| JP | A-2003-289465 | 10/2003 |
| JP | A-2004-247913 | 9/2004 |
| JP | A-2004-297134 | 10/2004 |
| JP | A-2005-099439 | 4/2005 |
| JP | A-2005-341298 | 12/2005 |

OTHER PUBLICATIONS

Japanese Office Action issued in Application No. 2006-238977; Dated Dec. 14, 2010 (With Translation).

Japanese Office Action issued in Japanese Application No. 2006-238978 dated Oct. 25, 2011 (w/ English Translation).

\* cited by examiner

FIG.8

| PROGRAM | TIME | PARTICIPANTS | | | | |
|---|---|---|---|---|---|---|
| | | A | B | C | D | E |
| BASKET THROW | 10:00~10:30 | ✓ | | ✓ | | |
| 100 METER DASH | 10:40~11:10 | | | ✓ | | |
| DANCE (SENIORS) | 11:20~11:50 | ✓ | ✓ | | | ✓ |
| OBSTACLE RACE | 13:10~13:40 | | ✓ | | ✓ | |

FIG.10

TIME AXIS t

| REFERENCE TIME POINTS | t0 | t1 | t2 | t3 | t4 |
|---|---|---|---|---|---|
| PHOTOGRAPHIC SUBJECTS WITHIN RANGE OF PHOTOGRAPHY | B, C | B, C | C, A | C, A | A |
| OBSTRUCTION DECISIONS | B: NO OBSTRUCTION C: NO OBSTRUCTION | B: NO OBSTRUCTION C: NO OBSTRUCTION | C: NO OBSTRUCTION A: OBSTRUCTION PRESENT | C: NO OBSTRUCTION A: OBSTRUCTION PRESENT | A: OBSTRUCTION PRESENT |
| PHOTOGRAPHY GOOD/BAD DECISIONS | B: OK C: OK | B: OK C: OK | C: OK A: OK | C: OK A: OK | C: OK A: OK |
| PHOTOGRAPHIC SUBJECT INFORMATION | B, C | B, C | C | C | NONE |

FIG.11

|  | REFERENCE TIME POINTS | | | | |
| --- | --- | --- | --- | --- | --- |
|  | t0 | t1 | t2 | t3 | t4 |
| PHOTOGRAPHIC SUBJECT INFORMATION FOR VIDEO #1 | B, C | B, C | C | C | NONE |
| PHOTOGRAPHIC SUBJECT INFORMATION FOR VIDEO #2 | A, D | A, D | A, D | A, C | C, B |
| EDITED VIDEO FOR PHOTOGRAPHIC SUBJECT A | VIDEO #2 | VIDEO #2 | VIDEO #2 | VIDEO #2 | OVERALL PHOTO-GRAPHED VIDEO |
| EDITED VIDEO FOR PHOTOGRAPHIC SUBJECT B | VIDEO #1 | VIDEO #1 | OVERALL PHOTO-GRAPHED VIDEO | OVERALL PHOTO-GRAPHED VIDEO | VIDEO #2 |

FIG.17

PLEASE SELECT
PHOTOGRAPHIC SUBJECT

ID 1001

ID 1002

FIG.18
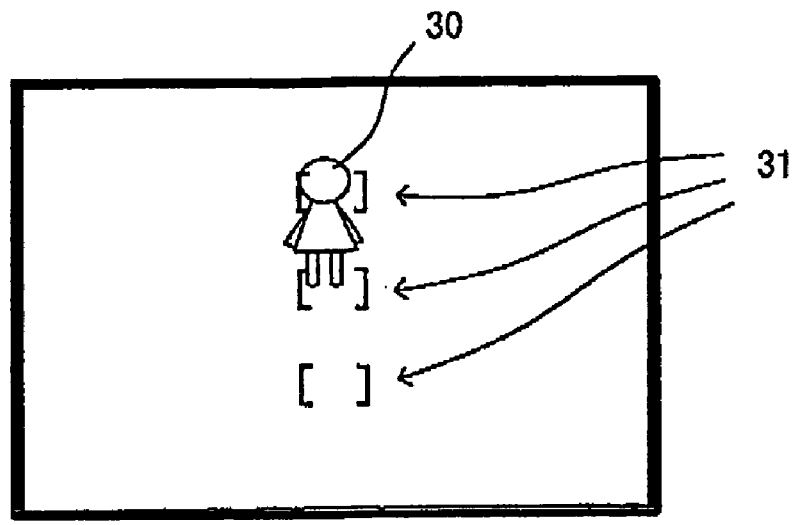
(a)
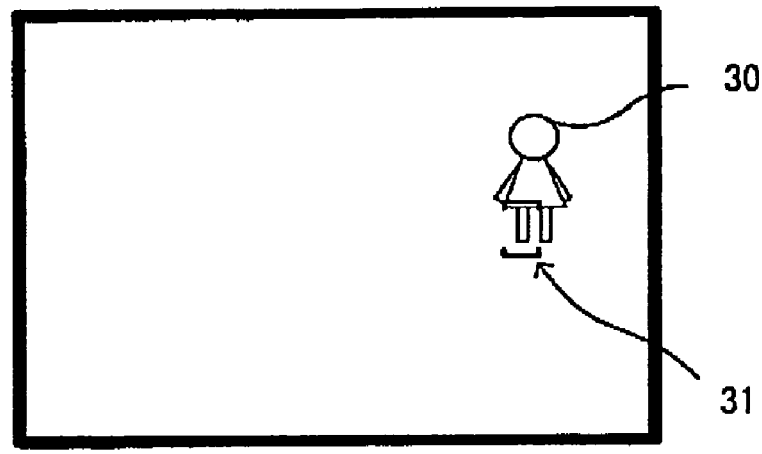
(b)
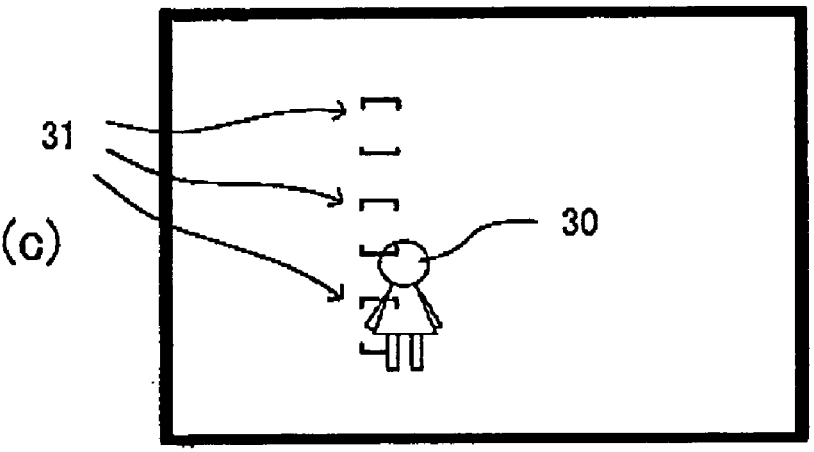
(c)

FIG.19
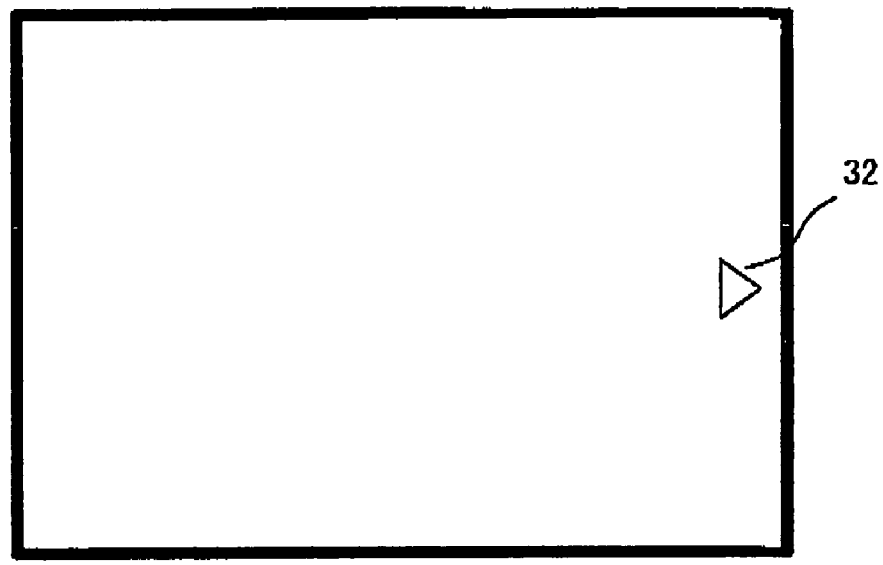
(a)
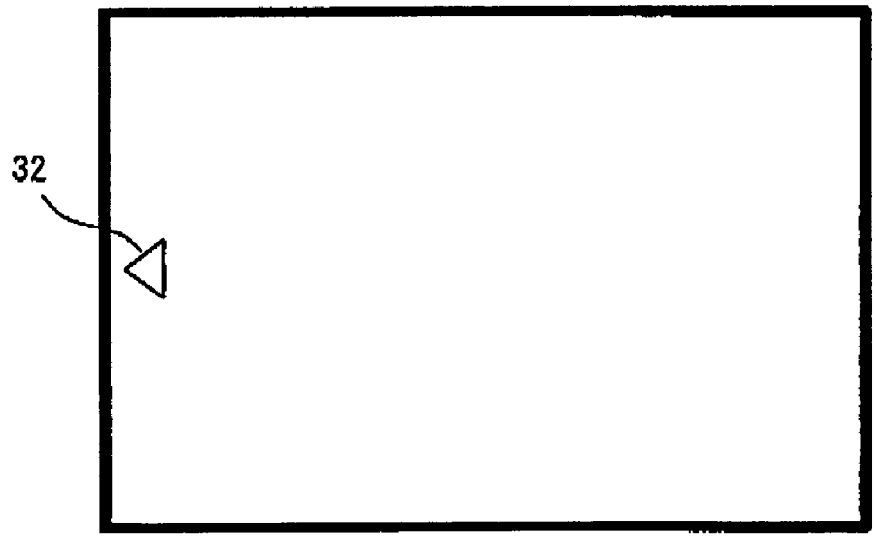
(b)

FIG.20
(a)
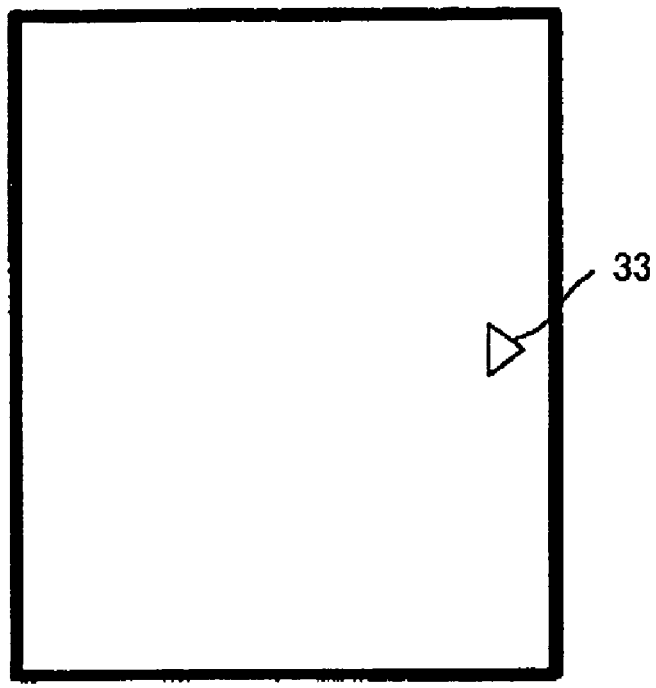
(b)
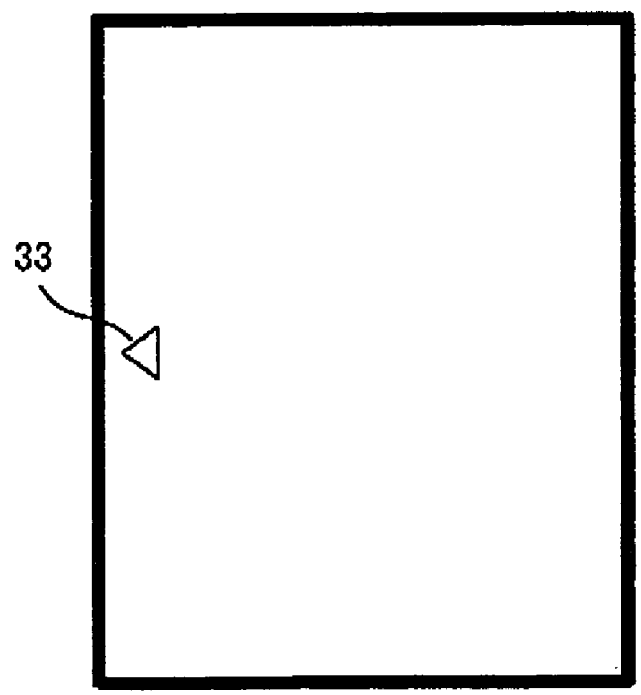

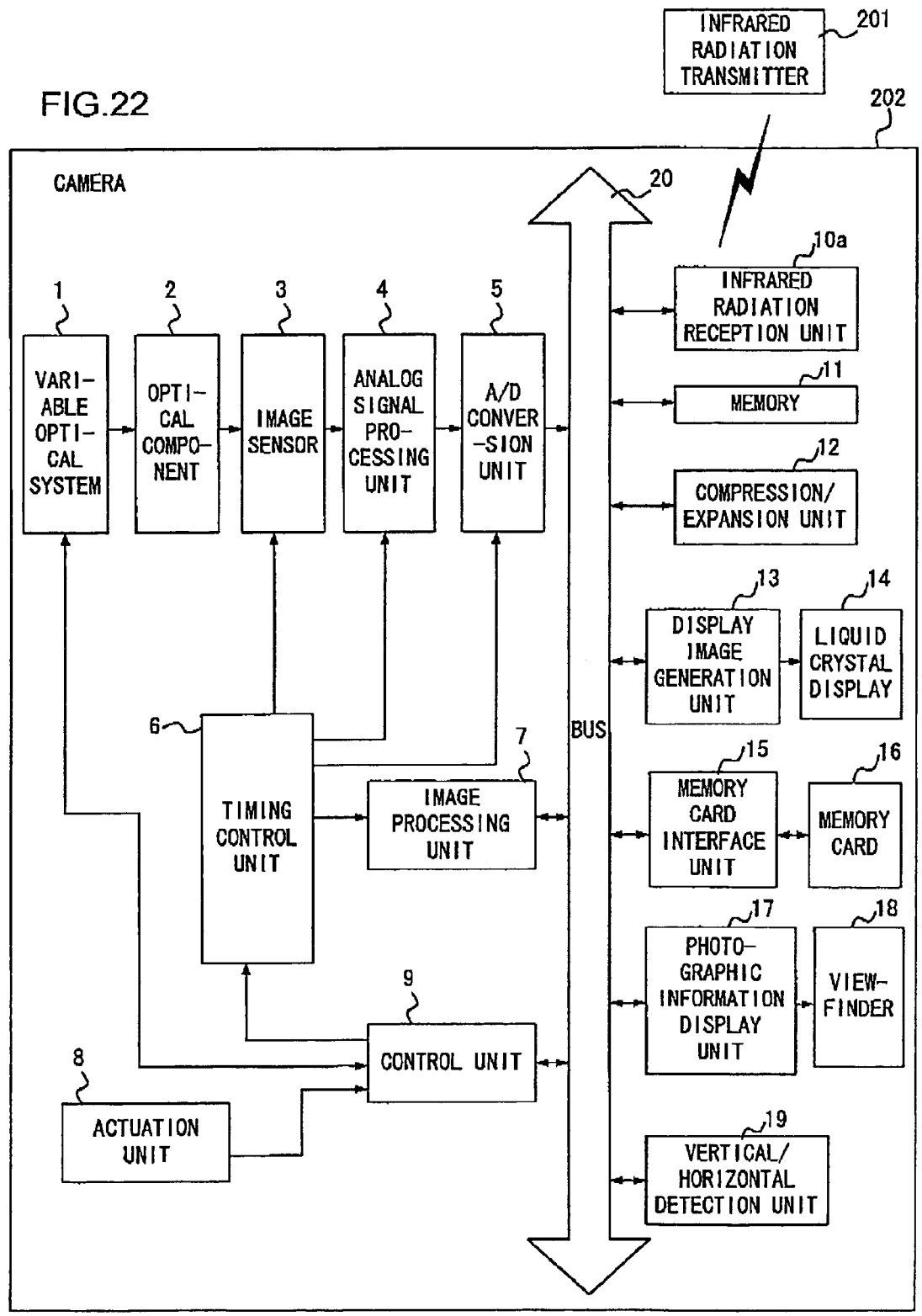

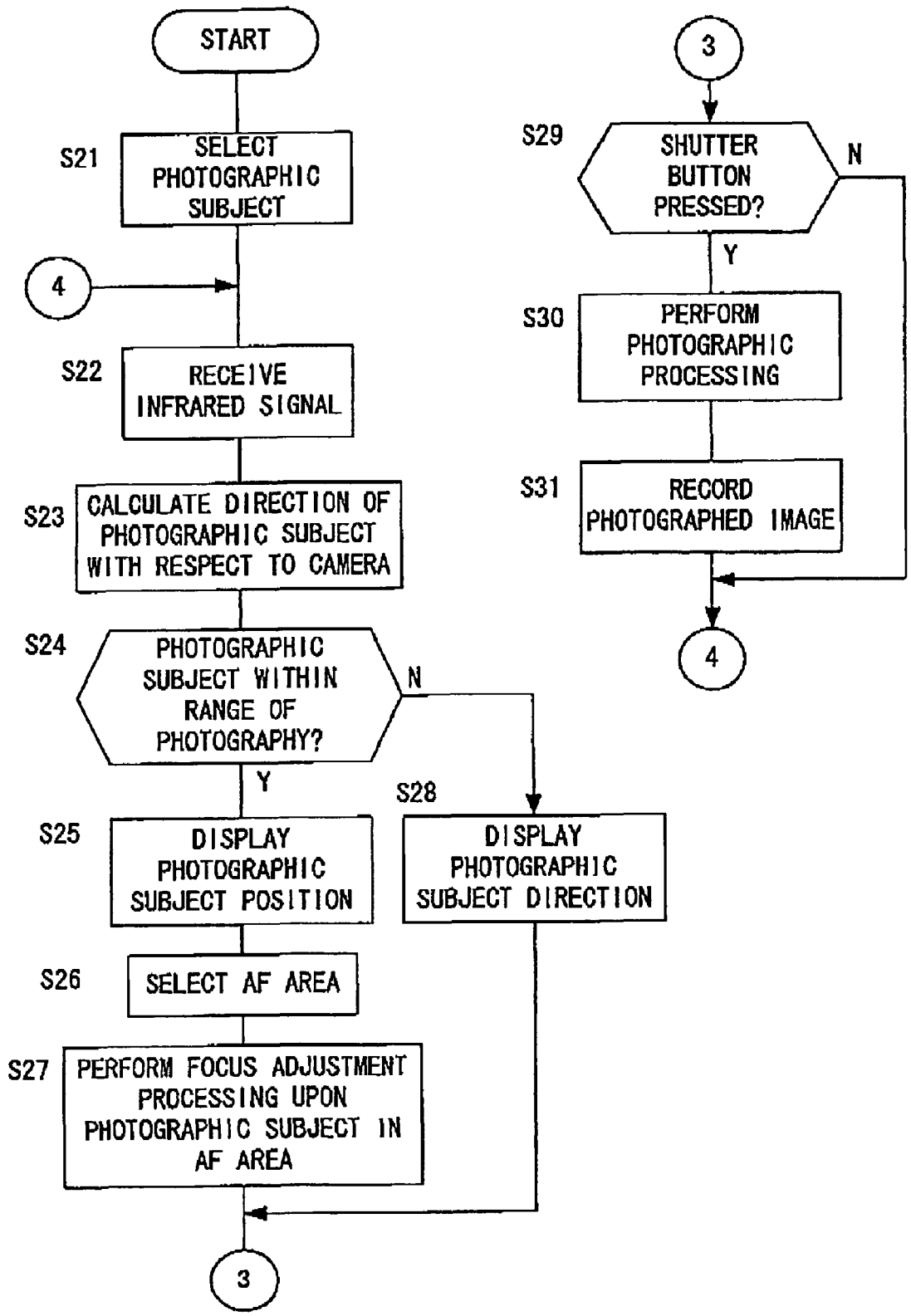

VIDEO SHARING SYSTEM, PHOTOGRAPHY SUPPORT SYSTEM, AND CAMERA

TECHNICAL FIELD

The present invention relates to a system that shares video photographed by cameras between a plurality of users, and to a system that supports a photographer while performing photography.

BACKGROUND ART

A system is known in the prior art (refer to Patent Reference #1) in which images that have been photographed with a portable telephone equipped with a digital camera are uploaded to a server upon the internet, and these images that have been uploaded are downloaded by a plurality of users such as family or friends or the like.

Moreover, a system is known in the prior art in which photography is performed by detecting a photographic subject. With the automatic photography system disclosed in Patent Reference #2, wireless tags are distributed to various users with information related to users stored upon these tags, and photographic units that are installed at various locations for photography shoot images of the users when the wireless tags that the users hold are detected.

Patent Reference #1: Japanese Laid-Open Patent Publication No. 2005-341298
Patent Reference #2: Japanese Laid-Open Patent Publication No. 2005-99439

DISCLOSURE OF THE INVENTION

Problems to be Solved by the Invention

By applying a system of the type described above to a video sharing system, it is possible for videos that have been shot in the same facility by a plurality of photographers to be shared. For example, parents of children at an event such as a sports meeting or the like can share videos of their own children that they have photographed. However, with the prior art system disclosed in Patent Reference #1, a user who is employing the system needs to replay the videos one by one and check them, since the contents of a video cannot be known without actually replaying and inspecting that video, so that the convenience of use is bad. Accordingly, there is a need for a system whose convenience of use is good when sharing videos that have been shot by a plurality of photographers within the same facility.

Moreover, an automatic photography system such as that disclosed in Patent Reference #2 may be used for automatic photography at a photographic location such as a recreational facility like a theme park or an amusement park or the like, but is not suitable for use in a situation in which a photographer is taking a photograph of a specific photographic subject, such as, for example, when a photographer is photographing his own child at a sports meeting. Accordingly, a photography support system is needed that supports a photographer when he is taking a photograph of a specific photographic subject.

Means for Solving the Problems

A video sharing system according to a 1st aspect of the present invention, accumulating various videos and enabling a plurality of users to utilize these accumulated videos, comprises a plurality of cameras that photograph any one of a plurality of photographic subjects present within a facility; a video collection unit that collects photographed videos photographed by the plurality of cameras; a photographic subject identification unit that identifies the photographic subjects in the photographed videos, for each photographed video; and an accumulation unit that accumulates the photographed videos collected by the video collection unit, and photographic subject information specifying the photographic subjects identified by the photographic subject identification unit.

According to a 2nd aspect of the present invention, it is preferable for the video sharing system according to the 1st aspect that this video sharing system further comprises a position identification unit that identifies positions of the photographic subjects and of the cameras within the facility; and the photographic subject identification unit identifies the photographic subjects in the photographed videos on the basis of the positions of the photographic subjects and of the cameras identified by the position identification unit.

According to a 3rd aspect of the present invention, the video sharing system according to the 2nd aspect may further comprise a plurality of transmission units that are held by the plurality of photographic subjects and by a plurality of photographers who perform photography using any one of the plurality of cameras, each of which transmits its own intrinsic identification information; and a plurality of reception units that are installed in the facility, receiving the identification information transmitted from the transmission units; and the position identification unit may identify the positions of the photographic subjects and of the cameras within the facility, on the basis of the identification information received by the reception units, and the positions of installation of the reception units that have received this identification information.

According to a 4th aspect of the present invention, it is preferable for the video sharing system according to the 2nd or 3rd aspect that this video sharing system further comprises a photographic information collection unit that collects, from the plurality of cameras, photographic information including at least one of photographic direction, focal distance, zoom amount, and angle of view; and a range of photography calculation unit that calculates ranges of photography of the cameras, on the basis of the photographic information collected by the photographic information collection unit; and the photographic subject identification unit identifies the photographic subjects in the photographed videos, on the basis of the positions of the photographic subjects and of the cameras identified by the position identification unit, and the ranges of photography of the cameras calculated by the range of photography calculation unit.

According to a 5th aspect of the present invention, it is more preferable for the video sharing system according to the 4th aspect that this video sharing system further comprises an obstruction decision unit that decides upon the presence or absence of photographic obstructions in the photographed videos, and the photographic subject identification unit further identifies the photographic subjects in the photographed videos on the basis of the decision results by the obstruction decision unit.

According to a 6th aspect of the present invention, the video sharing system according to the 4th or 5th aspect may further comprise a photography good/bad decision unit that makes a decision as to whether the photographic states in the photographed videos are good or bad, and the photographic subject identification unit may further identify the photographic subjects in the photographed videos on the basis of the decision results by the photographic good/bad decision unit.

A video sharing system according to a 7th aspect of the present invention, accumulating various videos and enabling a plurality of users to utilize these accumulated videos, comprises an accumulation unit that accumulates a plurality of photographed videos in which certain ones among a plurality of photographic subjects present in a facility are photographed; a photographic subject selection unit that selects a photographic subject to be an editing subject; an extraction unit that extracts a plurality of video portions in which the photographic subject selected by the photographic subject selection unit is photographed, from certain ones of the plurality of photographed videos accumulated by the accumulation unit; and an editing unit that prepares an edited video for the selected photographic subject, by sequentially inserting the plurality of video portions extracted by the extraction unit so as to edit the video.

According to an 8th aspect of the present invention, it is preferable for the video sharing system according to the 7th aspect that this video sharing system further comprises a position identification unit that identifies positions of the photographic subjects and of a plurality of cameras within the facility, the cameras having photographed the plurality of photographed videos; a photographic subject identification unit that identifies the photographic subjects in the photographed videos accumulated by the accumulation unit, on the basis of the positions of the photographic subjects and of the cameras identified by the position identification unit; and a photographic subject information recording unit that records photographic subject information specifying the photographic subjects identified by the photographic subject identification unit; and the extraction unit extracts the video portions in which the selected photographic subject is photographed, on the basis of the photographic subject information that has been recorded by the photographic subject information recording unit.

According to a 9th aspect of the present invention, it is more preferable for the video sharing system according to the 8th aspect that this video sharing system further comprises a plurality of transmission units that are held by the plurality of photographic subjects and by a plurality of photographers who perform photography using any one of the plurality of cameras, each of which transmits its own intrinsic identification information; and a plurality of reception units that are installed in the facility, receiving the identification information transmitted from the transmission units; and the position identification unit identifies the positions of the photographic subjects and of the cameras within the facility, on the basis of the identification information received by the reception units, and the positions of installation of the reception units that have received this identification information.

According to a 10th aspect of the present invention, in the video sharing system according to any one of the 7th through 9th aspects, the extraction unit may extract, from the same photographed video, a video portion that continues for at least a predetermined time period.

According to an 11th aspect of the present invention, in the video sharing system according to any one of the 7th through 10th aspects, when the selected photographic subject is not photographed in any of the photographed videos, the editing unit may also insert an overall photographed video that is determined in advance.

According to a 12th aspect of the present invention, it is preferable for the video sharing system according to any one of the 7th through 11th aspects that this video sharing system further comprises a priority decision unit that, if the selected photographic subject is photographed in a plurality of the photographed videos during the same time period, decides that one of the plurality of photographed videos should be accorded priority; and the extraction unit extracts a video portion from that photographed video to which the priority decision unit has decided that priority should be accorded.

According to a 13th aspect of the present invention, in the video sharing system according to the 12th aspect, the priority decision unit may decide that one of the plurality of photographed videos should be accorded priority, on the basis of the positional relationship of the camera and the photographic subject, or on the basis of the image conditions of the photographed videos.

According to a 14th aspect of the present invention, the video sharing system according to any one of the 7th through 13th aspects may further comprise a user information registration unit that registers user information specifying correspondence relationship between the photographic subjects and users; and, when a request arrives from some user for the preparation of an edited video, the photographic subject selection unit may select a photographic subject to be the editing subject for that user, on the basis of the user information that is registered in advance by the user information registration unit.

According to a 15th aspect of the present invention, the video sharing system according to any one of the 7th through 14th aspects may further comprise a time point range setting unit that sets a range of photographic time points for video portions extracted by the extraction unit, on the basis of event program information that is registered in advance.

According to a 16th aspect of the present invention, it is preferable for the video sharing system according to any one of the 7th through 15th aspects that this video sharing system further comprises a charging money amount calculation unit that calculates an amount of money to be charged to a user for an edited video that has been prepared by the editing unit for the user; and a reception money amount calculation unit that calculates an amount of money to be received by the user for an edited video that has been prepared by the editing unit for a user other than the user.

According to a 17th aspect of the present invention, it is more preferable for the video sharing system according to the 16th aspect that the charging money amount calculation unit calculates the amount of money to be charged to the user, according to the length of time over which a video photographed by another user is inserted into the edited video that has been prepared for the user.

According to an 18th aspect of the present invention, in the video sharing system according to the 16th or 17th aspect, the reception money amount calculation unit may calculate the amount of money to be received by that user, according to the length of time over which a video photographed by the user is inserted into an edited video that has been prepared for some user other than the user.

A video sharing system according to a 19th aspect of the present invention, accumulating various videos and enabling a plurality of users to utilize these accumulated videos, comprises a plurality of cameras that photograph any one of a plurality of photographic subjects present within a facility; a video collection unit that collects photographed videos photographed by the plurality of cameras; an accumulation unit that accumulates the photographed videos collected by the video collection unit; and a schedule management unit that issues a warning to a photographer of a photographic subject whose appearance is imminent, among the plurality of photographic subjects.

According to a 20th aspect of the present invention, in the video sharing system according to the 19th aspect, it is preferable that, a predetermined time period before the next event on a program starts, the schedule management unit decides the photographic subject whose appearance is imminent by identifying a photographic subject who is scheduled to appear in that event.

According to a 21st aspect of the present invention, in the video sharing system according to the 19th or 20th aspect, the schedule management unit may identify a photographic subject who is scheduled to appear in the next event on a program, on the basis of registered participant information for each event on the program that has been registered in advance.

According to a 22nd aspect of the present invention, in the video sharing system according to any one of the 19th through 21st aspects, the schedule management unit may issue the warning by transmitting a control signal that commands the camera to perform some specific operation.

According to a 23rd aspect of the present invention, in the video sharing system according to any one of the 19th through 21st aspects, the schedule management unit may also issue the warning by transmitting an email to an email address of a portable telephone that is held by the photographer and registered in advance.

A photography support system according to a 24th aspect of the present invention comprises one or a plurality of transmission units, respectively held by one or two or more photographic subjects, each of which transmits intrinsic identification information; and a camera for photographing the photographic subject; and position information for the photographic subject is supplied to a photographer by the camera, on the basis of the relative position of the photographic subject with respect to the camera that is obtained on the basis of identification information transmitted from the transmission unit.

According to a 25th aspect of the present invention, it is preferable for the photography support system according to the 24th aspect that this photography support system further comprises a plurality of reception units, each of which is installed in a facility, receiving the identification information transmitted from the transmission unit; a photographic subject position identification unit that identifies the position of the photographic subject in the facility, on the basis of the identification information received by one of the reception units, and the position of installation of that reception unit that has received the identification information; a camera position identification unit that identifies the position of the camera in the facility; and a relative position calculation unit that obtains the relative position of the photographic subject with respect to the camera, on the basis of the position of the photographic subject identified by the photographic subject position identification unit, and the position of the camera identified by the camera position identification unit.

According to a 26th aspect of the present invention, it is more preferable for the photography support system according to the 25th aspect that the transmission unit is further held by the photographer; and the camera position identification unit identifies the position of the camera in the facility, on the basis of the identification information that is transmitted from the transmission unit held by the photographer and received by the reception unit, and the position of installation of the reception unit that has received this identification information.

According to a 27th aspect of the present invention, in the photography support system according to the 25th or 26th aspect, the camera may decide whether or not the photographic subject is within a range of photography, and changes the position information for the photographic subject that is supplied to the photographer according to the result of this decision.

According to a 28th aspect of the present invention, in the photography support system according to the 27th aspect, if it is decided that the photographic subject is within the range of photography, the camera may also supply the position information for the photographic subject to the photographer by displaying the position of the photographic subject within the range of photography.

According to a 29th aspect of the present invention, it is preferable for the photography support system according to the 28th aspect that the camera displays the position of the photographic subject within the range of photography by using a portion of an auto focus area that is displayed as overlapped over a viewfinder image for indicating the auto focus region during photography.

According to a 30th aspect of the present invention, it is preferable for the photography support system according to any one of the 27th through 29th aspects that, if it is decided that the photographic subject is not within the range of photography, the camera supplies the position information for the photographic subject to the photographer by displaying the direction to the photographic subject with respect to the range of photography.

According to a 31st aspect of the present invention, in the photography support system according to the 30th aspect, the camera may display a sign in the viewfinder that indicates the direction to the photographic subject with respect to the range of photography.

According to a 32nd aspect of the present invention, it is preferable for the photography support system according to any one of the 28th through 31st aspects that, when displaying the position or the direction of the photographic subject, the camera changes over between vertical and horizontal display, according to the orientation in which the photographer is holding the camera.

According to a 33rd aspect of the present invention, in the photography support system according to any one of the 25th thorough 32nd aspects, the camera may perform focus adjustment on the basis of the relative position of the photographic subject that has been obtained by the relative position calculation unit.

According to a 34th aspect of the present invention, it is preferable for the photography support system according to the 33rd aspect that, if the photographic subject is within the range of photography, the camera performs focus adjustment by matching the focus to the photographic subject who is within the range of photography; and if the photographic subject is not within the range of photography, the camera performs focus adjustment on the basis of the relative position of the photographic subject that has been obtained by the relative position calculation unit.

According to a 35th aspect of the present invention, in the photography support system according to the 24th aspect, the camera may include a reception unit for receiving identification information transmitted from the transmission unit, and a relative position calculation unit that obtains the relative position of the photographic subject with respect to that camera, on the basis of the identification information received by the reception unit, and its direction of reception.

According to a 36th aspect of the present invention, it is preferable for the photography support system according to the 35th aspect that the camera decides whether or not the photographic subject is within a range of photography, and changes the position information for the photographic subject that is supplied to the photographer according to the result of this decision.

According to a 37th aspect of the present invention, it is preferable for the photography support system according to the 36th aspect that, if it is decided that the photographic subject is within the range of photography, the camera supplies the position information for the photographic subject to the photographer by displaying the position of the photographic subject within the range of photography.

According to a 38th aspect of the present invention, in the photography support system according to the 37th aspect, the camera may display the position of the photographic subject within the range of photography by using a portion of an auto focus area that is displayed as overlapped over a viewfinder image for indicating the auto focus region during photography.

According to a 39th aspect of the present invention, it is preferable for the photography support system according to any one of the 36th through 38th aspects that, if it is decided that the photographic subject is not within the range of photography, the camera supplies the position information for the photographic subject to the photographer by displaying the direction to the photographic subject with respect to the range of photography.

According to a 40th aspect of the present invention, in the photography support system according to the 39th aspect, the camera may display a sign in the viewfinder that indicates the direction to the photographic subject with respect to the range of photography.

According to a 41st aspect of the present invention, it is preferable for the photography support system according to any one of the 37th through 40th aspects that, when displaying the position or the direction of the photographic subject, the camera changes over between vertical and horizontal display, according to the orientation in which the photographer is holding the camera.

According to a 42nd aspect of the present invention, in the photography support system according to any one of the 24th through 41st aspects, the photographic subject for whom position information may be supplied to the photographer is selected by the camera, on the basis of information related to the transmission unit held by the photographic subject, registered in advance in the camera.

A camera according to a 43rd aspect of the present invention is used in the photography support system according to any one of the 24th through 42nd aspects.

Advantageous Effect of the Invention

According to the present invention, it is possible to supply a system whose convenience of use is good, when a plurality of photographers in the same facility are sharing the videos that they have photographed, such as the videos that the parents of children, who have become photographers, have shot of their own children at a sports meeting.

In addition, according to the present invention, when a photographer is looking for and photographing a specific photographic subject, as when a parent at a sports meeting is photographing his own child or the like, it is possible to support the photographer by supplying position information for this photographic subject.

BRIEF DESCRIPTION OF THE DRAWINGS

FIG. 8 is a figure showing an example of registered participant information;

FIG. 10 is a figure showing an example of photographic subject information recorded for a video that has been photographed in the photographic situation of FIG. 9;

FIG. 11 is a figure showing a concrete example of edited videos that have been created by the video editing processing;

FIG. 17 is a figure showing an example of a screen that is displayed during selection of a photographic subject;

FIG. 18 is a figure showing examples of display of the position of a photographic subject in a viewfinder;

FIG. 19 is another figure showing examples of display of the position of a photographic subject in the viewfinder;

FIG. 20 is another figure showing examples of display of the direction of a photographic subject in the viewfinder, when the camera is held vertically;

FIG. 22 is a block diagram showing the structure of a camera in this photography support system according to the third embodiment of the present invention; and FIG. 23 is a flow chart showing processing executed by a camera in this photography support system according to the third embodiment of the present invention.

BEST MODE FOR CARRYING OUT THE INVENTION

First Embodiment

Figure 1:
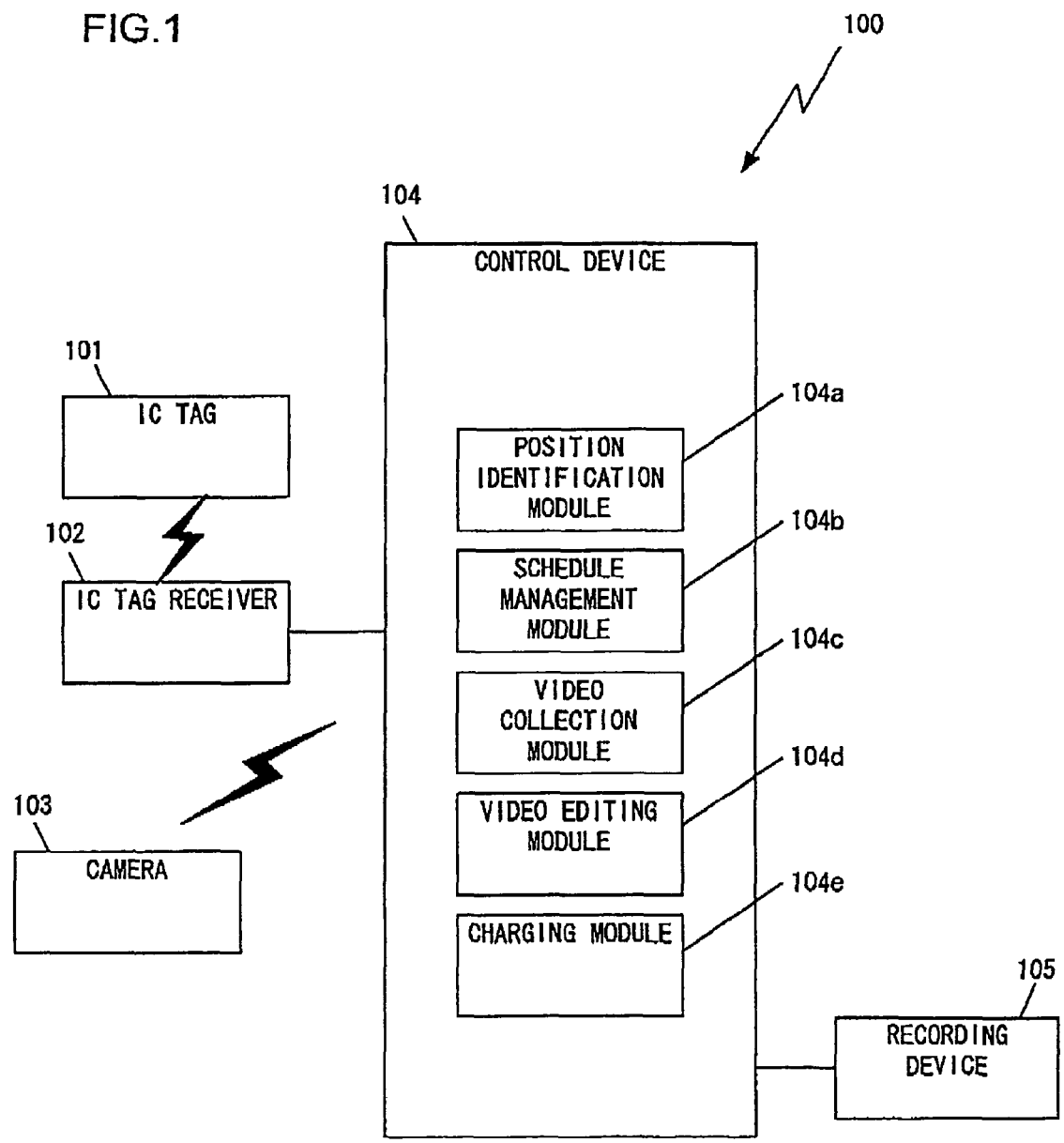
FIG. 1 is a block diagram showing the structure of a video sharing system according to a first embodiment of the present invention.

FIG. 1 is a block diagram showing the structure of a video sharing system according to an embodiment of the present invention. This video sharing system is one that is used when a plurality of photographers are sharing videos that have been shot in a facility such as, principally, a kindergarten or nursery school or elementary school or the like. By using this video sharing system, parents can share videos of their own children photographed by the parents at an event such as, for example, a sports meeting or the like, with other parents. Due to this, even in a setup in which a parent has not been able to take a good video of his own child due to the child being hidden behind an obstruction or the like, he becomes able to obtain a video in which his own child is present by utilizing the videos that have been shot by other parents in this scene.

The video sharing system 100 of FIG. 1 includes an IC tag 101, an IC tag receiver 102, a camera 103, a control device 104, and a recording device 105. It should be understood that the IC tag receiver 102, the control device 104, and the recording device 105 are installed to a facility in advance. On the other hand, the IC tag 101 and the camera 103 are possessed by a child and a photographer, who are users of this video sharing system 100.

Each and every one of a number of children who are to be subjects of photography with the camera 103 (kindergarten children, elementary school children, and so on) possesses one of the IC tags 101. For example, IC tags 101 may be installed upon their name tags, caps, shoes, kindergarten uniforms, gym suits or the like, so that the IC tags 101 are carried by the children due to the fact that they are wearing these items. Moreover, each and every photographer who possesses one of the cameras 103 (such as a parent or the like) also possesses an IC tag 101. In this case, it would be acceptable for these IC tags 101 to be installed upon the clothes of the photographers or the like, just as in the case of the children, or to be installed in the cameras 103. In other words, while in FIG. 1 one IC tag 101 is shown by a single block as a representative, actually this video sharing system 100 includes a plurality of IC tags 101, corresponding to the number of children and photographers.

To each IC tag 101 there is allocated an intrinsic tag number for uniquely specifying that IC tag 101, and thereby it becomes possible to identify the person who is holding the IC tag 101 with that tag number. In concrete terms, tag management information in which the tag numbers of the plurality of IC tags 101 each carried by photographers or children and the people who possess these tags are held in mutual correspondence is recorded in advance in the recording device 105 that will be described hereinafter. And the control device 104 identifies who are the holders of these IC tags 101 on the basis of the tag numbers of the IC tags 101 that have been read out by the IC tag receiver 102. It should be understood that the tag numbers of the IC tags 101 are transmitted to the IC tag receiver 102 as part of the tag information. In other words, each of the IC tags 101 transmits tag information as identification information that is intrinsic to that tag.

The IC tag receivers 102 are installed at predetermined intervals in the facility in which this video sharing system 100 is being used. In concrete terms, these receivers 102 are installed by being embedded in the ground of a play area or a school yard or under the floor of a building of the facility or the like, with predetermined gaps being left between them like the intersections upon a go board (for example at intervals of 2 meters apart under the ground, or at intervals of 1 meter apart under the floor). In other words, while in FIG. 1 one IC tag receiver 102 is shown by a single block as a representative, actually this video sharing system 100 includes a plurality of such IC tag receivers 102. Moreover, a receiver number is allocated to each of the IC tag receivers 102 for uniquely identifying that IC tag receiver 102. And receiver management information in which the installation position of each of the IC tag receivers 102 and its receiver number are held in mutual correspondence is recorded in the recording device 105.

When a child or a photographer passes over any one of the IC tag receivers 102 that are installed, as described above, at predetermined intervals in the facility, this IC tag receiver 102 reads in by wireless communication the tag information from the IC tag 101 held by the person who has passed over it, and outputs this tag information and its own receiver number to the control device 104. In the control device 104, as will be described hereinafter, by identifying the tag number included in this tag information and the position of installation of this receiver on the basis of its receiver number, it is possible to identify the position where the person (in other words, the child or the photographer) who is holding this IC tag 101 is in the facility. To put this in another manner, it is possible to identify the position where a child who is a subject for photography is in the facility, or the position where a camera 103 held by a photographer is in the facility, on the basis of the identification information intrinsic to each IC tag 101 that has been received by the IC tag receiver 102, and on the basis of the position of installation of that IC tag receiver 102 that has received this identification information from this IC tag 101.

Figure 2:
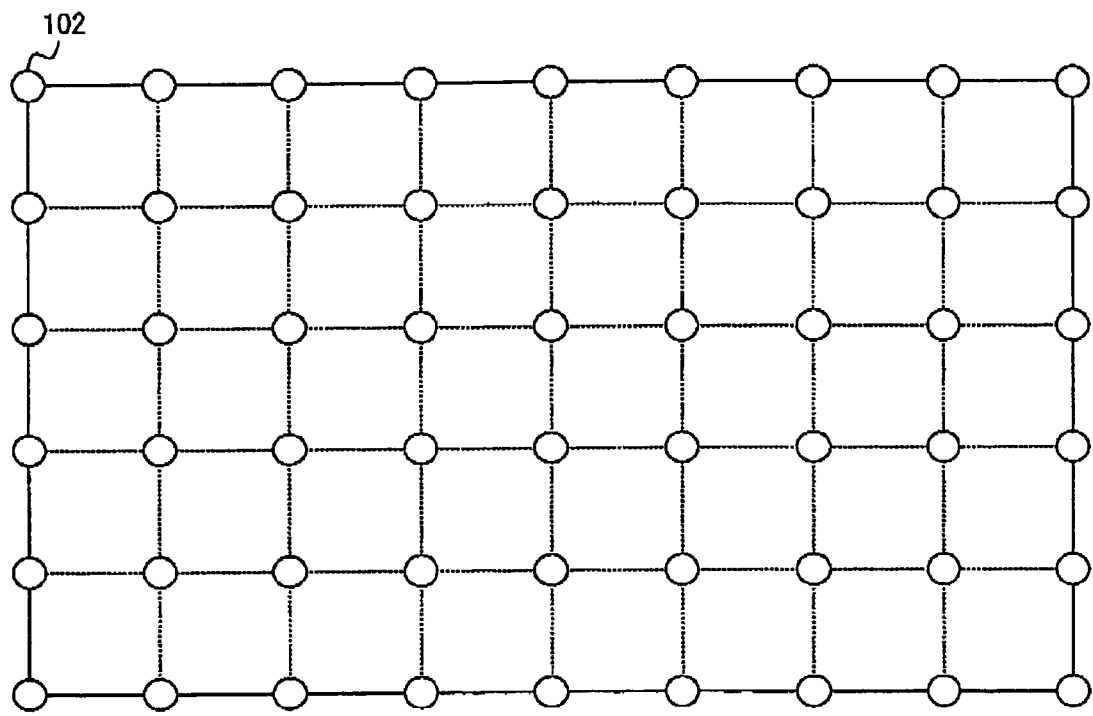
FIG. 2 is a figure showing an example of installation of IC tag receivers.

FIG. 2 is a figure showing an example of installation of IC tag receivers 102 in a play area or a schoolyard, or in a building of a facility. In FIG. 2, the positions of installation of the IC tag receivers 102 are shown by white circles. In the example shown in this FIG. 2, the IC tag receivers 102 are installed in a facility at equal intervals. It should be understood that the intervals between the IC tag receivers 102 need not be equal intervals as shown in FIG. 2.

The camera 103 is one that is held by a photographer, and, according to actuation by the photographer, it photographs one or more of the children who are present in the facility and transmits the resulting videos successively to the control device 104. Moreover, the camera obtains the photographic directions and the focal distances during photography, and the amounts of zooming of the photographic lens and its angles of view and so on, and sequentially transmits information among these that is required for calculating ranges of photography as will be explained hereinafter, to the control device 104 as photographic information, along with the photographed videos. With regard to the photographic direction, it should be understood that, for example, the camera 103 may be internally equipped with an azimuth detection sensor or an attitude detection sensor or the like, and may detect the photographic direction by detecting which way the camera is pointing using this sensor. It would also be acceptable to arrange for this photographic information to be transmitted along with the photographed video by embedding it within the video data as meta data.

It should be understood that, if there are a plurality of photographers in the facility, a camera 103 is possessed by each of these photographers. In other words, while in FIG. 1 one camera 103 is shown by a single block as a representative, actually this video sharing system 100 includes a plurality of such cameras 103.

The control device 104 may be, for example, a computer device such as a personal computer or a server or the like, and is connected to the IC tag receivers 102 that are installed in a plurality of spots within the facility via a LAN or the like that is laid down within the facility. Moreover, the control device 104 is connected to the cameras 103 via a wireless communication line such as a wireless LAN or the like, and is also connected to the recording device 105 via some predetermined interface. Functionally, this control device 104 includes a position identification module 104a, a schedule management module 104b, a video collection module 104c, a video editing module 104d, and a charging module 104e.

When an item of tag information and a receiver number are inputted from an IC tag receiver 102, the position identification module 104a identifies the position of installation of the IC tag receiver 102 that corresponds to the inputted receiver number on the basis of the receiver management information recorded in the recording device 105 as explained above, and also identifies the tag number of the IC tag 101 having transmitted the tag information on the basis of the inputted tag information. Based upon the position of installation of the IC tag receiver 102 and the tag number of the IC tag 101 that have been identified in this manner, the position identification module 104a specifies where the person (a child or a photographer) who is holding this IC tag 101 to which the tag number is assigned is located within the facility. And if this person is a child this position is taken as being the position of a photographic subject, whereas if the person is a photographer this position is taken as being the position of a camera, and in either case the position is recorded in the recording device 105. This photographic subject position or camera position is updated when the tag information of the IC tag 101 is received by some IC tag receiver 102 that is different from the previous IC tag receiver 102, due to the child or the photographer who holds this IC tag 101 moving about.

The schedule management module 104b identifies the anticipated participants in the next event on the program based upon registered participant information for each event on the program that is registered in advance according to an event schedule, and then transmits warning information to photographers who wish to photograph these anticipated participants as photographic subjects for inviting them to start photography. For example, at a sports meeting, warning information is transmitted to the parents of children who will participate in the next competition. This transmission of warning information may be, for example, performed by transmitting control signals that command the cameras 103 held by the photographers to perform some specific operation, such as turning on their power supply, outputting a warning noise, blinking the display on their liquid crystal monitor, providing a warning display upon their liquid crystal monitor such as "5 minutes to go", or the like. It should be understood that, in this case, a correspondence relationship between the photographic subjects (the children) and the cameras 103 should be registered in advance. Or, these warnings may be issued by transmitting emails to the email addresses of the portable telephones of the parents, which are registered in advance. It should be understood that registered participant information for each event on the program is recorded in the recording device 105.

The video collection module 104c collects the photographed videos from the various cameras 103 by receiving them as they are photographed by the cameras 103 and transmitted in sequence, and records these videos in the recording device 105. Thus, a plurality of videos that are collected from the plurality of cameras 103 are recorded in the recording device 105 by this video collection module 104c. Moreover, as previously described, the photographic condition information is sequentially received from the cameras 103 along with the photographed videos, and is recorded at predetermined intervals with the photographed videos. This photographic condition information that has been recorded in this manner is used when obtaining the ranges of photography by the cameras 103, during video decision processing that is performed by the video editing module 104d as will be described hereinafter.

The video editing module 104d identifies the photographic subjects in the various photographed videos that have been collected from the plurality of cameras 103 by the video collection module 104c, and, on the basis of the results of this identification, performs editing of a video in which various ones of these photographic subjects are taken as subjects for editing. In this video editing, portions are extracted at predetermined intervals of those videos, from among the various photographed videos that have been collected, in which the photographic subject who has been set as the subject for editing is photographed best, and an edited video adapted to this photographic subject is prepared by editing a video in which these video portions are sequentially inserted. The details of the processing at this time will be explained hereinafter.

When an edited video that has been prepared by the video editing module 104d by editing a plurality of photographed videos is supplied to a user, the charging module 104e performs calculation of an amount of money to be charged to the user or the user is to receive. At this time, if a video that has been photographed by some photographer other than the user has been utilized in this edited video, then an amount of money according to the time period of utilizing the video is charged to the user, and is paid to the video supplier. Conversely to this, if a video photographed by the user has been supplied to another user and has been utilized in an edited video, then an amount of money according to the time period of utilizing the video is paid to the user. The concrete method by which this amount of money to be charged or to be paid is calculated will be explained hereinafter in detail.

The recording device 105 is able to record and accumulate various kinds of information such as those previously described, i.e. including the tag management information, the receiver management information, the information about the photographic subject positions and the camera positions that have been identified by the position identification module 104a, the videos photographed by the cameras 103 and the photographic information that have been collected by the video collection module 104c, the registered participant information for each event on the program, and so on. For this recording device 105, for example, a hard disk or the like may be used.

By using the video sharing system 100 as explained above, it is possible to collect videos that have been photographed by the parents whose children as subjects for photography are attending a sports meeting and share them with the other parents. And, after the sports meeting has ended, when each parent sets his own child as the subject for editing thorough the method of accessing this video sharing system 100 from his home personal computer or the like, it is possible to prepare edited videos in which his own child has been photographed best by using not only his own photographed videos but also the photographed videos of the other parents that have been shared.

Figure 3:
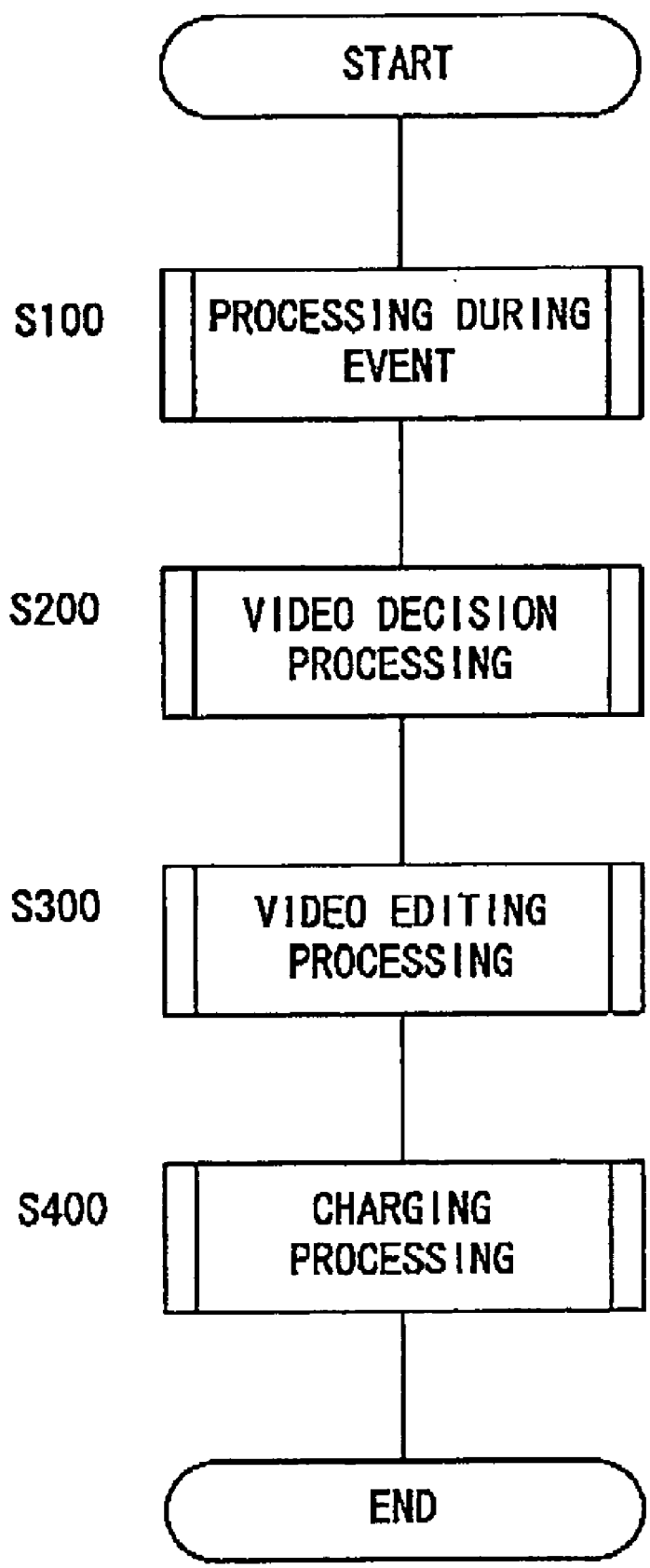
FIG. 3 is a flow chart showing processing executed by the video sharing system according to the first embodiment of the present invention.

FIG. 3 is a flowchart showing processing executed by the control device 104 of the video sharing system 100. As shown in this flow chart, the control device 104 executes, in order: in a step S100, processing during an event; in a step S200, video decision processing in a step S300, video editing processing; and, in a step S400, charging processing. The concrete details of the processing in each of these steps will be explained below using the flow charts of FIGS. 4 through 7. It should be understood that the processing during the event of the step S100 is executed while an event such as a sports meeting or the like is being held, while the other processing steps are executed after the event ends.

Figure 4:
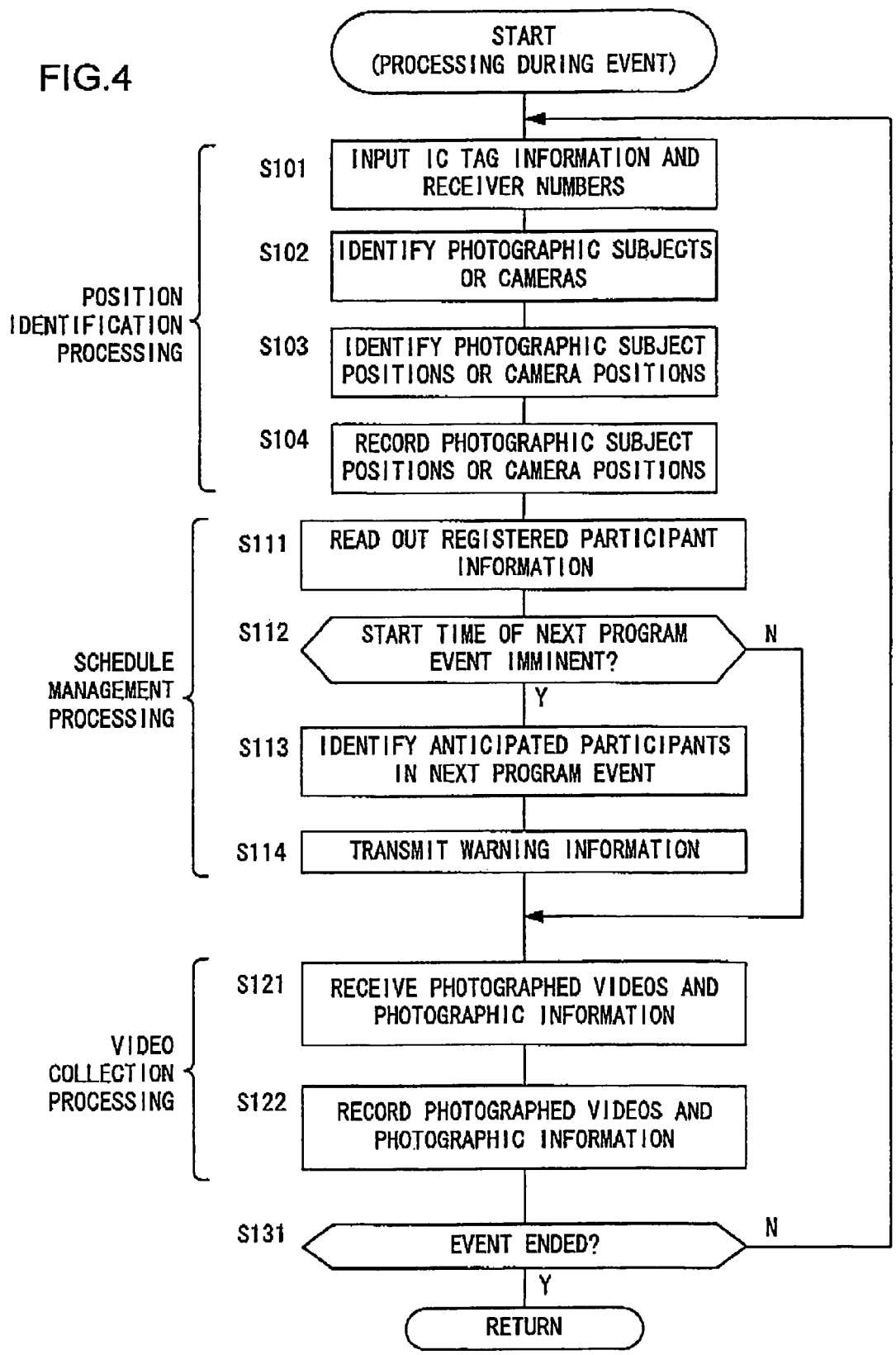
FIG. 4 is a flow chart of processing that is executed for processing during an event.

FIG. 4 is a flow chart of the processing that is executed for the processing during an event, which is shown in the step S100 of FIG. 3. This flow chart consists of position identification processing of steps S101 through S104, schedule management processing of steps S111 through S114, video collection processing of steps S121 and S122, and decision processing of a step S131. It should be understood that, in the control device 104, the position identification processing is executed by the position identification module 104a, the schedule management processing is executed by the schedule management module 104b, and the video collection processing is executed by the video collection module 104c.

In the step S101, the tag information and the receiver numbers are inputted from the IC tag receivers 102. In a step S102, on the basis of the tag numbers inputted in the step S101 and the tag management information recorded in the recording device 105, the corresponding photographic subjects or cameras 103 are specified. In a step S103, for the photographic subjects or cameras 103 that have been identified in the step S103, the photographic subject positions or camera positions are identified on the basis of the receiver numbers inputted in the step S101 and the receiver management information recorded in the recording device 105. In the step S104, the photographic subject positions or camera positions that have been identified in the step S103 are recorded in the recording device 105.

By the position identification processing of the steps S101 through S104 explained above, if the tag number inputted from the IC tag receiver 102 is one that has been allocated to an IC tag 101 possessed by a child, then this child is identified as being a subject for photography, and the position where the child is located is recorded in the recording device 105 as the photographic subject position. Moreover, if the tag number inputted from the IC tag receiver 102 is one that has been allocated to an IC tag 101 possessed by a parent who is a photographer, then the camera 103 held by this photographer is identified, and the position where that camera is located is recorded in the recording device 105 as the camera position. By doing this, for the plurality of photographic subjects and cameras 103 that are included in the video sharing system 100, the respective photographic subject positions and camera positions are recorded.

In the step S111, the registered participant information recorded in the recording device 105 is read out. An example of this registered participant information is shown in FIG. 8. In this example, for each of the competition programs "basket throw", "100 meter dash", "dance (seniors)", and "obstacle race", it is shown whether or not children A through E will compete. By checking in advance check boxes for the children who are going to enter the competition program, this type of registered participant information may be registered by the system manager or by the parents of the children.

In a step S112, on the basis of the registered participant information read out in the step S111, a decision is made as to whether or not the current time is near the start time of the next event on the program. Here, it is decided that the current time is near the start time of the next event on the program, a predetermined time period before the next event on the program starts, for example five minutes before. In other words, in the example of registered participant information shown in FIG. 8, for example, when 9:55 arrives it may be decided that the start time for the "basket throw" has become imminent, and when 10:35 arrives it may be decided that the start time for the "100 meter dash" has become imminent. If the result of this decision is affirmative, then the flow of control proceeds to a step S113. On the other hand, if a negative decision is reached in this step S112, then the flow of control skips the steps S113 and S114 and proceeds next to the step S121.

In the step S113, the anticipated participants in the next event on the program are identified on the basis of the registered participant information that was read out in the step S111. By identifying the anticipated participants in the next event on the program in this manner, the photographic subjects who will appear soon are decided upon. Then, in the step S114, warning information that conveys an invitation to perform photography is transmitted by a method such as that described previously to the persons who are going to perform photography, as photographic subjects, of the anticipated participants identified in the step S113. In other words, in the example of registered participant information shown in FIG. 8, for example, when the time reaches 9:55, warning information is transmitted to the parents of the children A and C to attend at the "basket throw", and, when the time reaches 10:35, warning information is transmitted to the parent of the child C to attend the "100 meter dash".

By the schedule management processing of the steps S111 through S114 explained above, when the time reaches some predetermined time period before the start of the next item upon the program, the anticipated photographic subjects who will appear in the next event upon the program are identified on the basis of the registered participant information for each event on the program, which is registered in advance. By doing this, the photographic subjects whose appearance is close are determined, and warnings are issued to the photographers who will photograph these photographic subjects by transmitting control signals commanding specific operations to the cameras 103 held by these photographers, or by transmitting emails to the email addresses of the portable telephones held by the photographers, which are registered in advance. Accordingly, even if a photographer does not remember the schedule of the events, he is still reliably able to photograph the photographic subject whom he wishes to photograph, without missing any photographic opportunities.

In the step S121, the photographed videos and the photographic information transmitted from the cameras 103 are received. In this photographic information, photographic conditions of various types during photography with the cameras 103 are specified, as previously described. In the step S122, the photographed videos and photographic information received in the step S121 are recorded in the recording device 105. At this time, it would be acceptable to arrange to adjust the white balance in these photographed videos, so that they match one another. By executing the video collection processing of the steps S121 and S122 in this manner, it is possible to collect the videos that have been photographed by a plurality of photographers with the cameras 103 and share them between each of the users.

It should be understood that, when transmitting the photographed videos and the photographic information from the cameras 103 as described above, it is necessary to attach time point information for executing video decision processing and video editing processing as will be described hereinafter. This time point information must be set so that it agrees for all of the photographed videos and all of the photographic information that are the subjects of processing. Due to this, it is necessary for all of the photographers to set the clocks of their cameras 103 to the same time in advance. For example, it would be possible to synchronize the clocks of the plurality of cameras 103 together automatically, by mounting to each camera 103 a radio clock that performs time point calibration by receiving standard radio waves.

In the step S131, a decision is made as to whether or not the event has ended. This decision may be made on the basis of the registered participant information that has been read out in the step S111, or may be made by detecting some predetermined actuation that is performed by the system manager or the like when the event ends. If it has been decided that the event has not yet ended, then the flow of control returns to the step S101 and the processing described above is repeated. On the other hand, if it has been decided that the event has already ended, then the flow chart of FIG. 4 terminates. In the processing during the event, processing such as that described above is executed.

Next the flow chart of FIG. 5, which is executed by the video editing module 104d during the video decision processing of the step S200, will be explained. In a step S201, setting of reference points in time for the photographed videos that have been collected and recorded upon the recording device 105 by the video collection processing described above is performed. These reference points in time are set at predetermined intervals between the start and the end of the videos, and may, for example, be set at intervals of one second. These reference time points are set in common for all of the videos. For example, the starting time point of the video that was photographed the earliest may be taken as being a first reference time point, and then the reference points in time for the videos may be set at predetermined intervals from then on. It should be understood that the interval at which these reference time points are set is determined according to the processing capability of the control device 104 and so on. In other words, the shorter is this set interval, the more does the total number of steps of processing that will be explained hereinafter increase, and so the more the processing load upon the control device 104 increases; thus, it is desirable to set this interval between the reference time points short if the processing capability of the control device 104 is high and to set it long if the processing capability is low, in order to keep this processing time period within a fixed range.

In a step S202, one is selected from among the photographed videos collected and recorded in the recording device 105 by the video collection processing described above. Here, for example, the videos may be selected in order from those that have been photographed by the photographer who is holding the IC tag 101 with the lowest tag number. And in a step S203, among the reference time points set in the step S201, the one at which the video selected in the step S202 starts is selected to be a first reference time point.

In a step S204, among the photographic information recorded along with the photographed video selected in the step S202, the photographic information at the currently selected reference time point is read out from the recording device 105. This currently selected reference time point is the reference time point that was selected in the step S203, or a time point that has been selected in a step S213, which will be described hereinafter. In other words, when initially the processing in this step S204 is executed, the first reference time point is taken as being this currently selected reference time point, whereas, thereafter, each time execution of the processing of this step S204 is repeated, the next reference time point is sequentially taken as the currently selected reference time point. It should be understood that, if the photographic information is embedded within the photographed videos as meta data as previously described, then reading out of the photographic information is performed by reading out the meta data embedded at the currently selected reference time point in the video selected in the step S202.

In a step S205, the range of photography of the camera 103 is calculated on the basis of the photographic information that has been read out in the step S204. Here, a predetermined range that is centered upon the photographic direction specified in the photographic information and is widened out therefrom is obtained as being the range of photography. The magnitude of this range of photography is determined according to the focal distance, the zoom amount or the viewing angle of the camera 103 as specified in the photographic information, or the like.

And in a step S206 the photographic subject position information and the camera position information at the currently selected reference time point are read out from the recording device 105. These photographic subject position information and camera position information have been recorded in the recording device 105 by the previously described position identification processing. It should be understood that while, for the photographic subject position information at this time, all of the photographic subject position information recorded in the recording device 105 is read out, on the other hand, for the camera position information, only the position information for the camera 103 having photographed the video selected in the step S202 is readout. In other words, the position information for all of the photographic subjects, and the position information for that camera 103 that corresponds to the selected photographed video, are read out from among the photographic subject position information and the camera position information that is recorded in the recording device 105.

In a step S207, the photographic subjects within the range of photography are identified on the basis of the range of photography calculated in the step S205, and the photographic subject position information and the camera position information that were read out in the step S206. In other words, the relative position of each photographic subject with respect to the camera 103 is obtained from the photographic subject position information and the camera position information, and the photographic subjects who are at these relative positions within the range of photography are identified. The processing of the steps S208 and S209 is executed for these photographic subjects within the range of photography who have been identified here as will be explained below. It should be understood that, if not even one photographic subject is identified within the range of photography in the step S207, then the processing of the steps S208, S209, and S210 is not executed, but rather "none" is recorded as the photographic subject information in the step S211.

In the step S208, an obstruction decision is made as to whether or not, in the photographed video that was selected in the step S202, there is any photographic obstruction that is getting in the way of photography. This obstruction decision may be made in the following manner. For example, the position of an obstruction that is present in the facility may be specified by attaching IC tags 101 to the four corners or the like of the obstruction, and the positions of these IC tags 101 may be specified as previously described by the position identification module 104a. By doing this, it is possible to make a decision as to whether or not a photographic obstruction is present, by comparing the position of the obstruction that is identified in this manner and the positions of the photographic subjects within the range of photography, and by making decisions as to whether or not the photographic subjects are hidden behind this obstruction. Or, it would also be acceptable to arrange to make this obstruction decision by recognizing, by image processing or the like, whether or not the photographic subjects in the photographed video are hidden behind the obstruction.

In the step S209, a photography good/bad decision is made as to whether or not the photographic state in the photographed video that was selected in the step S202 is good or bad. For example it may be detected whether or not camera shake or a focusing error has occurred during photography with the camera 103, and if such a situation is detected, then this may be notified to the control device 104 by the previously described photographic information or the like. The fact that this notification has been issued is recorded in the recording device 105 along with the photographed video, so that it is possible to perform the above photography good/bad decision by deciding whether or not the photographic state at the time of photography was bad. Or it would also be acceptable to perform the photography good/bad decision by calculating the distance from the camera 103 to a photographic subject who is within the range of photography on the basis of the camera position and the position of this photographic subject, by comparing together the result of this calculation and the focal distance in the photographic information, and by deciding that the photographic state was bad if the distance to the photographic subject was outside the range within which the camera 103 was capable of performing photography. Or, it would also be possible to perform the photography good/bad decision by performing image processing such as facial recognition or the like so as to recognize camera shake or focus blurring in the photographed video, or by deciding whether or not the brightness of the photographed video is appropriate.

In the step S210, the photographic subjects who were photographed appropriately in the photographed video are identified on the basis of the results of identification in the step S207 of the photographic subjects within the range of photography and on the basis of the result of the photography good/bad decision in the step S209. In other words, among the photographic subjects within the range of photography who were identified in the step S207, those for whom it was decided in the step S208 that there was no photographic obstruction, and furthermore for whom it was decided in the step S209 that the photographic state was good, are taken as being photographic subjects who were photographed properly in the photographed video. Then in the step S211 information specifying the photographic subjects who were identified in the step S210 is recorded in the recording device 105 as photographic subject information.

In a step S212, for the photographed video that was selected in the step S202, a decision is made as to whether or not time points have been selected up to a last reference time point. This last reference time point is that time point, among the reference time points set in the step S201, at the last position in the photographed video selected in the step S202. If the time points up to this last reference time point have not yet been selected, then the flow of control proceeds to a step S213, and, after the next reference time point after the one that is currently selected has been selected, then the flow of control returns to the step S204. Due to this, the next reference time point is sequentially selected, and execution of the processing described previously is repeated. On the other hand, if all of the reference time points up to the last reference time point have been selected, then the flow of control is transferred to a step S214.

In the step S214 a decision is made as to whether or not, by the processing of the step S202, all of the photographed videos that are recorded in the recording device 105 have already been selected. If some photographed video that has not yet been selected still remains, then the flow of control returns to the step S202, and the processing described above is repeated, after some different photographed video from those that have been selected up till now has been selected. By doing this, all of the photographed videos that were photographed by the cameras 103 and collected are sequentially selected, and execution of the video decision processing shown in the flow chart of FIG. 5 is repeatedly performed. On the other hand, if in the step S214 it is decided that all of the photographed videos have been selected, then the flow chart of FIG. 5 terminates. In this video decision processing, processing like that explained above is executed.

Figure 9:
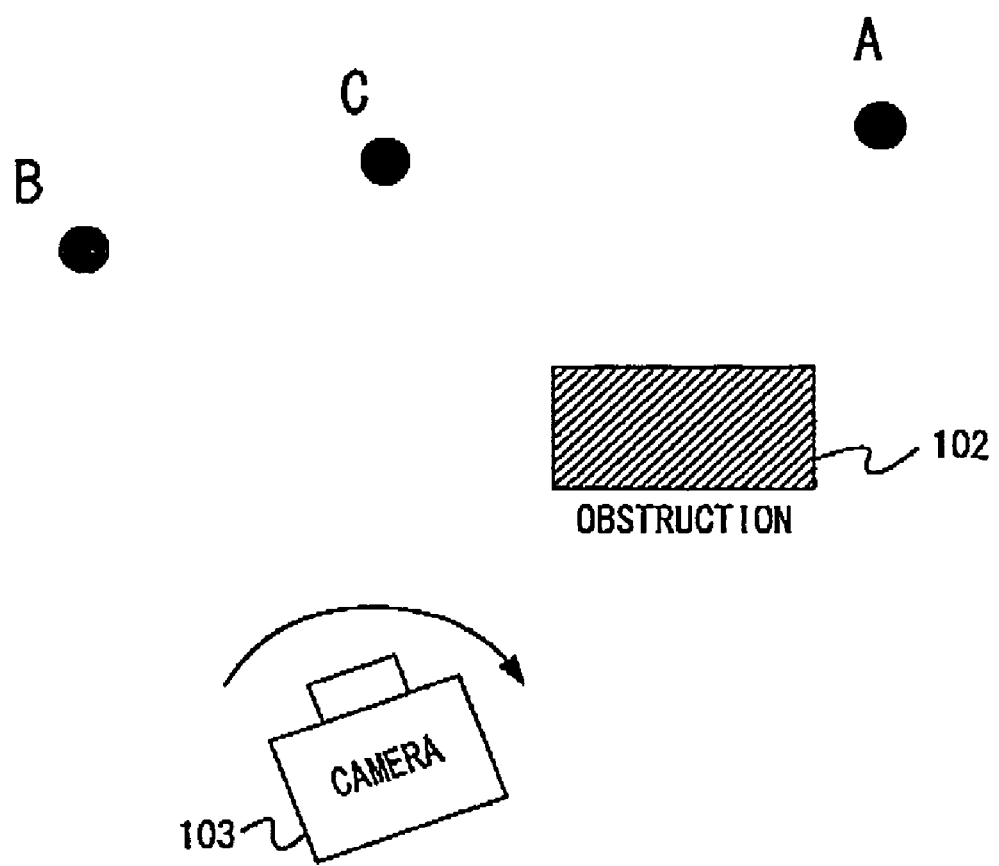
FIG. 9 is a figure showing an example of a photographic situation of a camera.

A concrete example of video decision processing like that explained above will now be explained using FIGS. 9 and 10. FIG. 9 shows an example of a photographic situation for a camera 103. In this example, a situation is shown in which photography is performed with the children A, B, or C taken as the photographic subjects, while the camera 103 rotates gradually in the rightwards direction. It should be understood that an obstruction 120 is present between the camera 103 and the child A.

Figure 5:
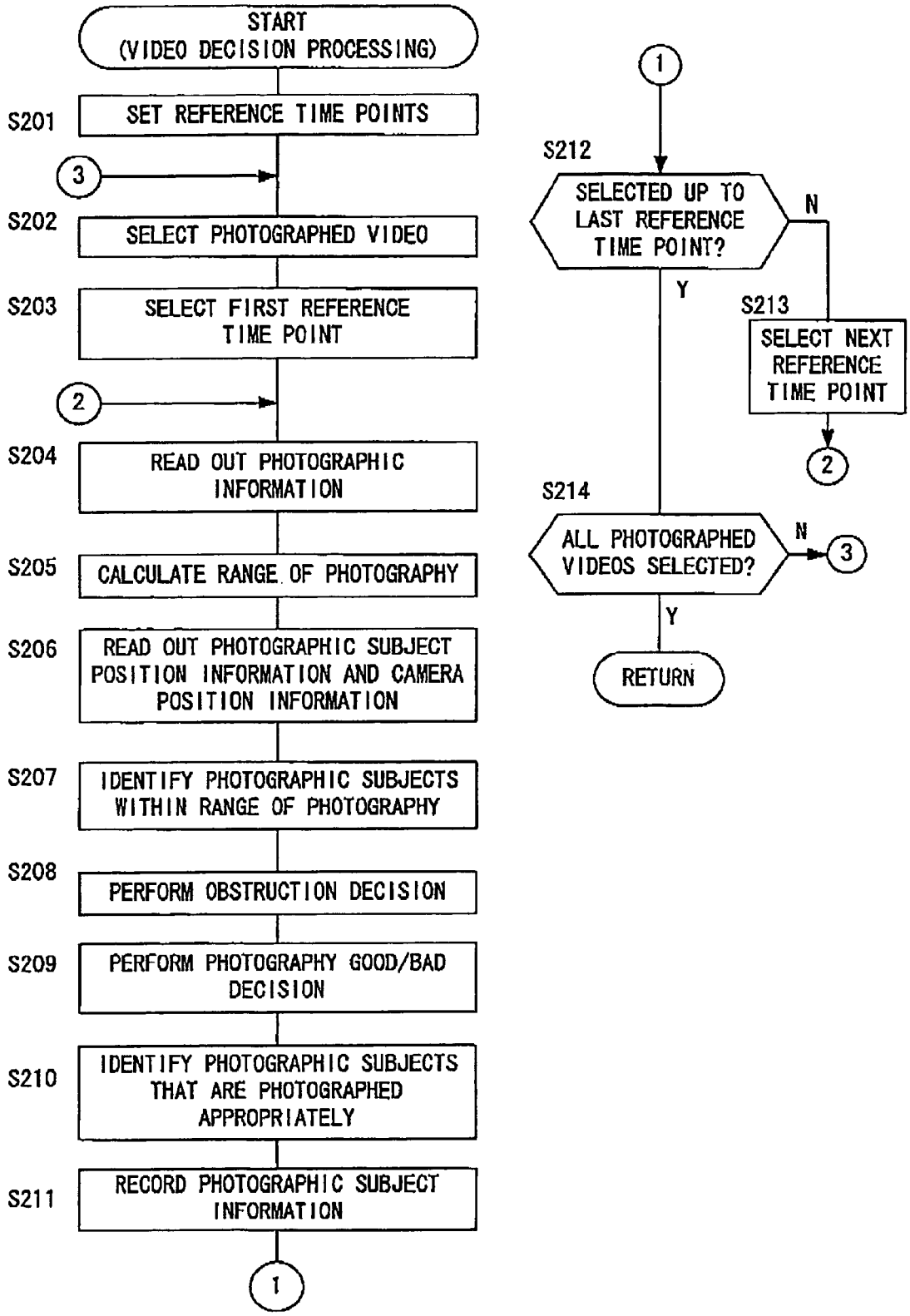
FIG. 5 is a flow chart of processing that is executed for video decision processing.

FIG. 10 shows an example of the photographic subject information that is recorded by the video decision processing for which the flow chart is shown in FIG. 5, for videos that have been photographed in the photographic situation of FIG. 9. At the first reference time point t0, the children B and C are positioned within the range of photography of the camera 103. At this time, according to the obstruction decision as previously described, it is decided that the obstruction 120 is not present between the children B and C who are the photographic subjects and the camera 103, and moreover it will be supposed that, according to the photography good/bad decision, the photographic state is good for both the children B and C. In this case, the children B and C are recorded in the photographic subject information for the reference time point t0. And the children B and C are recorded in the photographic subject information at the next reference time point t1 as well, in a similar manner to that described above.

At the reference time point t2 it will be supposed that, due to the camera 103 having rotated in the rightwards direction, the child B has gone out of the range of photography, and that the children C and A are now positioned within the range of photography. And it will be supposed that, due to an obstruction decision previously described, it has been decided that the obstruction 120 is present between the child A and the camera 103. In this case, at the reference time point t2, only the child C is recorded in the photographic subject information. And at the next reference time point t3 as well, in a similar manner, only the child C is recorded in the photographic subject information.

Moreover it will be supposed that subsequently, at the reference time point t4, since the child C has also gone out of the range of photography due to the camera 103 having further rotated in the rightwards direction, accordingly only the child A is positioned within the range of photography. Since, in this case, the obstruction 120 is present between the child A and the camera 103, accordingly "none" is recorded in the photographic subject information, without any of the children being recorded therein. The recording of the photographic subject information is performed as explained above.

Figure 6:
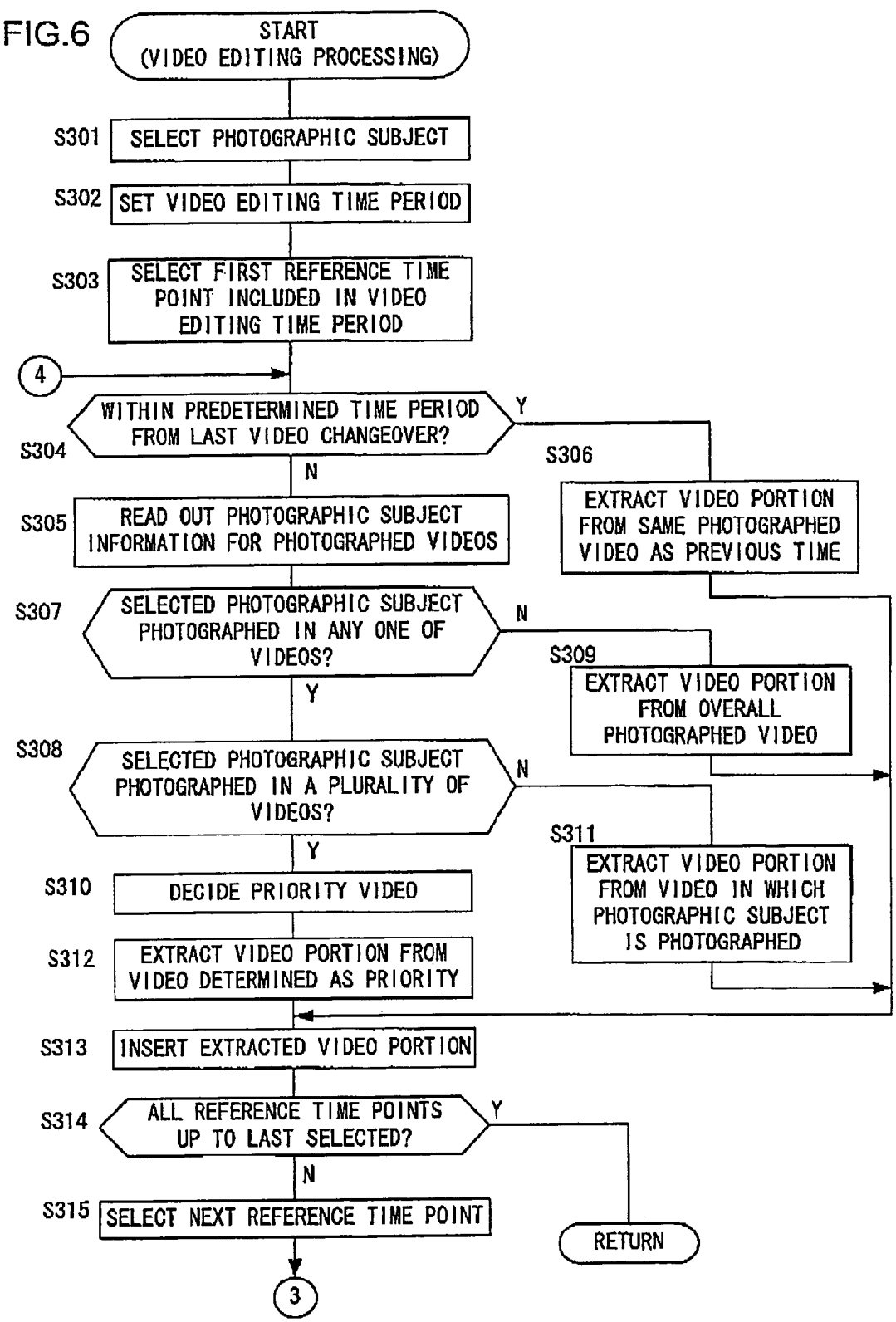
FIG. 6 is a flow chart of processing that is executed for video editing processing.

Next the flow chart of FIG. 6 that is executed by the video editing module 104*d* during the video editing processing of the step S300 of FIG. 3 will be explained. In a step S301, a selection of a photographic subject to be the subject of editing is performed. This selection of a photographic subject is performed, for example, by a parent who is a user accessing the video sharing system 100 from his own home personal computer after the sports meeting has ended, and designating his own child to be a subject of editing. Or it would also be acceptable, in this step S301, to select all of the children who attended the sports meeting sequentially, and to execute the flow chart of FIG. 6 for each of them in order.

It should be understood that it would also be acceptable, in this step S301, to arrange for user information to be registered in advance that specifies the correspondence relationship between the children, who are the photographic subjects in the photographed videos, and the parents who are the users; and to select the photographic subjects on the basis of this user information. In other words, when a request arrives from any one of the users to prepare an edited video, then the child of that user would be specified on the basis of the user information that is registered in advance, and this specified child would automatically be selected as the photographic subject who is to be the subject of editing for that user. By doing this, it is possible to prevent a user from designating the child of some other person as a subject of editing without permission, and thereby preparing an unauthorized edited video of that child.

In a step S302, setting of a video editing time period is performed. Here, when preparing an edited video according to the processing explained below, the video editing time period is set by setting a range of photographic time points for the video portions to be extracted from the photographed videos that have been accumulated. In other words, the video portions that were photographed at time points within this range of the video editing time period that is set here are extracted from the photographed videos, and an edited video is prepared using them. It may be arranged for this setting of the video editing time period to be performed directly by the parent who is the user from his own home personal computer, or for the entire time period over which the photographic subject who has been selected in the step S301 is photographed in any of the photographed videos to be automatically set. Or, by the user selecting any one event on the program on the basis of the event program information that is registered in advance, the time period of this program event may be set as the video editing time period. It should be understood that it would also be possible for this program event information to be utilized as the registered participant information for each event on the program, as shown in FIG. 8.

In a step S303, among the reference time points having been set in the step S201 of FIG. 5, the first reference time point that is included in the video editing time period having been set in the step S302 is selected. And in the next step S304 a decision is made as to whether or not this is still within a predetermined time period (for example two seconds) from when the video was changed over the previous time. In other words, if the distance between the reference time point that was selected by the step S303 or by a step S315 that will be described hereinafter, and the reference time point at which video change over was last performed, is separated by greater than or equal to the predetermined time period, then a negative decision is reached in this step S304 and the flow of control proceeds to a step S305. On the other hand, if the distance between the reference time point that was selected by the step S303 or by the step S315 that will be described hereinafter, and the reference time point at which video change over was last performed, is within the predetermined time period, then an affirmative decision is reached in this step S304 and the flow of control is transferred to a step S306. It should be understood that video change over means that, when a video portion that has been extracted from any of the photographed videos due to the processing of steps S309, S311, or S312 that will be described hereinafter is inserted into an edited video in a step S313, a video portion from a different photographed video from any until now is inserted.

If the flow of control has proceeded from the step S304 to the step S305, then in the step S305 the photographic subject information for each of the photographed videos recorded as previously described by the video decision processing is read out from the recording device 105. When this step S305 has been executed then the flow of control is transferred to a step S307.

On the other hand, if the flow of control has proceeded from the step S304 to the step S306, then in the step S306 the video portion from the currently selected reference time point to the next reference time point is extracted from the same photographed video as the time before. By doing this, it is possible to extract video portions from the same photographed video, continuing onwards for at least a predetermined time period.

Due to this, changing over between the videos in the edited video (i.e. changing over between cameras) does not occur until, at least, this predetermined time period elapses. As a result, it is possible to prevent the edited video from changing over too frequently and becoming hard to view. After the step S306 has been executed, the flow of control is transferred to the step S313.

In the step S307 a decision is made, on the basis of the photographic subject information for the various photographed videos that was read out in the step S305, as to whether or not the photographic subject who was selected as the subject for editing in the step S301 is photographed in any one of the photographed videos at the currently selected reference time point. In other words, if the photographic subject who has been selected as being the subject of editing is recorded in the photographic subject information for at least one of the photographed videos that have been read out, then an affirmative decision is reached in this step S307, and the flow of control proceeds to the step S308. On the other hand, if the photographic subject who has been selected is not recorded in any item of the photographic subject information that has been read out, then a negative decision is reached in this step S307 and the flow of control is transferred to a step S309.

If the flow of control has been transferred from the step S307 to the step S309, then in the step S309 the video portion from the currently selected reference time point to the next reference time point is extracted from the overall photographed video in which the situation at the overall event was photographed. This overall photographed video has been photographed by the event promoter or the like. Due to this, even if the photographic subject who has been selected as the subject of editing is not photographed in any of the photographed videos, still it is possible to insert an appropriate video matched to the event into the edited video. It should be understood that, instead of inserting an overall photographed video, it would also be acceptable to arrange, for example, to insert a video that has been photographed by the parent himself who designated his own child as the subject for editing, or to select and to insert any one of videos photographed by some other parents arbitrarily. After this step S309 has been executed, the flow of control is transferred to the step S313.

On the other hand, if the flow of control has proceeded from the step S307 to the step S308, then in the step S308 a decision is made, on the basis of the photographic subject information that was read out in the step S305, as to whether or not the photographic subject who was selected in the step S301 to be the subject of editing is photographed in a plurality of the photographed videos within the same time period. In other words if, in the photographic subject information for the photographed videos that has been read out, the photographic subject who has been selected as the subject for editing is recorded in a plurality of these items of photographic subject information, then an affirmative decision is reached in this step S308 and the flow of control is transferred to the step S310. On the other hand, if the photographic subject who has been selected is recorded in only one of the items of photographic subject information that have been read out, then a negative decision is reached in this step S308 and the flow of control is transferred to the step S311.

If the flow of control has been transferred from the step S308 to the step S310, then, in this step S310, one of the plurality of photographed videos in which it has been decided in the step S308 that the photographic subject who is the subject of editing has been photographed is decided to be a photographed video that must be prioritized (i.e. a priority video). This decision may, for example, be performed in the following manner, on the basis of the positional relationship between the camera 103 and the photographic subject, or upon the image conditions of the photographed videos. For example, on the basis of the photographic information, the photographic subject position information, and the camera position information, it may be determined which photographed video is to be the priority video by distinguishing the one for which the distance between the camera 103 having photographed that video and the photographic subject is the closest, or by distinguishing the one in which the photographic subject is closest to the center of the range of photography. Or it would also be acceptable, by video processing or the like, to arrange to decide which is to be the priority video by distinguishing which of the photographed videos is the one with the least shaking or blurring. It should be understood that it would also be acceptable to arrange to make it possible to make a setting as to which condition, at this time, should be most emphasized. When the priority video has been decided upon in the step S310, the flow of control is transferred to a step S312.

On the other hand, if the flow of control has been transferred from the step S308 to the step S311, then, in this step S311, the video portion from the currently selected reference time point to the next reference time point is extracted from the one and only photographed video for which it was decided in the step S308 that the photographic subject who is the subject of editing is photographed. When this step S311 has been executed, the flow of control proceeds to the step S313.

In the step S312, the video portion from the currently selected reference time point to the next reference time point is extracted from the photographed video that was decided in the step S310 to be the priority video. Due to this, even if the photographic subject who has been selected as the subject of editing is photographed in a plurality of photographed videos, still it is possible to extract the video portion from that one among these photographed videos that is most suitable. When this step S312 has been executed, the flow of control proceeds to the step S313.

In the step S313, the video portion extracted in the steps S306, S309, S311, or S312 are inserted into the edited video. By doing this, the video portion from the currently selected reference time point to the next reference time point is inserted into the edited video. It should be understood that, for the audio at this time, it would be acceptable to utilize audio that was recorded as a master audio stream, so as to be the same for all of the video.

In the step S314, the last reference time point included in the video editing time period that was set in the step S302 is selected. If all the reference points up to and including the last reference time point have not yet been selected, then the flow of control proceeds to a step S315, and, after the next reference time point after the currently selected one has been selected in this step S315, then the flow of control returns to the step S304. Due to this, the next reference time point is selected in sequence and the processing as previously described is executed. On the other hand, if in the step S314 it has been decided that all the reference points up to and including the last reference time point have now been selected, then the flow chart of FIG. 6 terminates. Due to this, an edited video is prepared into which a plurality of video portions extracted from any desired ones of a plurality of photographed videos are sequentially inserted, and, as a result, an edited video is prepared with the photographic subjects who were selected as editing subjects. By processing such as the above, the video editing processing is executed.

A concrete example of an edited video that is prepared by video editing processing such as that explained above is shown in FIG. 11. In this example there is shown, if each of the children A and B of FIG. 9 is selected as the photographic subject to be a subject of editing, what type of video is inserted in the edited video that is prepared for each of them. It will be supposed that, as shown in FIG. 11, for the video that has been photographed with the camera 103 shown in FIG. 9 (termed "video #1"), photographic subject information with the same contents as that shown in FIG. 10 is recorded. Moreover it will be supposed that, for video that has been photographed with a different camera 103 (termed "video #2"), photographic subject information as shown in FIG. 11 is recorded.

At a first reference time point t0, in the video #1, from its photographic subject information, it is known that the children B and C were being photographed, while in the video #2, from its photographic subject information, it is known that the children A and D were being photographed. Accordingly, if the child A has been selected as the subject for editing, then, into the edited video that is prepared by the video editing processing (termed the "edited video for the photographic subject A"), the video #2 in which this child A is photographed is inserted over the interval from the reference time point t0 to the next reference time point t1. Moreover, if the child B has been selected as the subject for editing, then, into the edited video that is prepared by the video editing processing (termed the "edited video for the photographic subject B"), the video #2 in which this child B is photographed is inserted over the interval from the reference time point t0 to the next reference time point t1. In a similar manner to the above, into the edited video for the photographic subject A, the video #2 in which this child A is photographed is also inserted over the interval from the reference time point t1 to the next reference time point t2; and, into the edited video for the photographic subject B, the video #1 in which this child B is photographed is also inserted over this interval.

Now, at the reference time point t2, it is known from the photographic subject information for the video #1 that the child B is not photographed in this video, but only the child C is photographed therein. Since, at this time, the child B is not photographed in either of the videos #1 or #2, accordingly the overall photographed video that has been photographed by the promoter of the event or the like is inserted into the edited video for this photographic subject B over the interval from the reference time point t2 to the next reference time point t3. On the other hand, into the edited video for the photographic subject A, the video #2 in which this child A is photographed is also inserted over the interval from the reference time point t2 to the next reference time point t3, just as in the previous interval.

And, at the reference time point t3, it is known from the photographic subject information for the video #2 that the children A and C are photographed in this video, but the child D is not photographed therein. Thus, at this time as well, just as in the case of the reference time point t2, the video #2 is also inserted into the edited video for the photographic subject A over the interval from the reference time point t3 to the next reference time point t4, while the overall photographed video is inserted into the edited video for the photographic subject B.

Moreover, at the reference time point t4, it is known from the photographic subject information for the video #1 that none of the children are photographed in this video, while it is also known from the photographic subject information for the video #2 that the children C and B are photographed therein. Thus, at this time, since the child A is not photographed in either of the videos #1 and #2, accordingly the overall photographed video is inserted into the edited video for this photographic subject A. On the other hand, the video #2 in which the child B is photographed is inserted into the edited video for this photographic subject B. As has been explained above, by joining together various videos in order and inserting them into the edited video for the photographic subject A and into the edited video for the photographic subject B, these edited videos are prepared for each of the children A and B, with these subjects for editing being designated as the photographic subjects.

Figure 7:
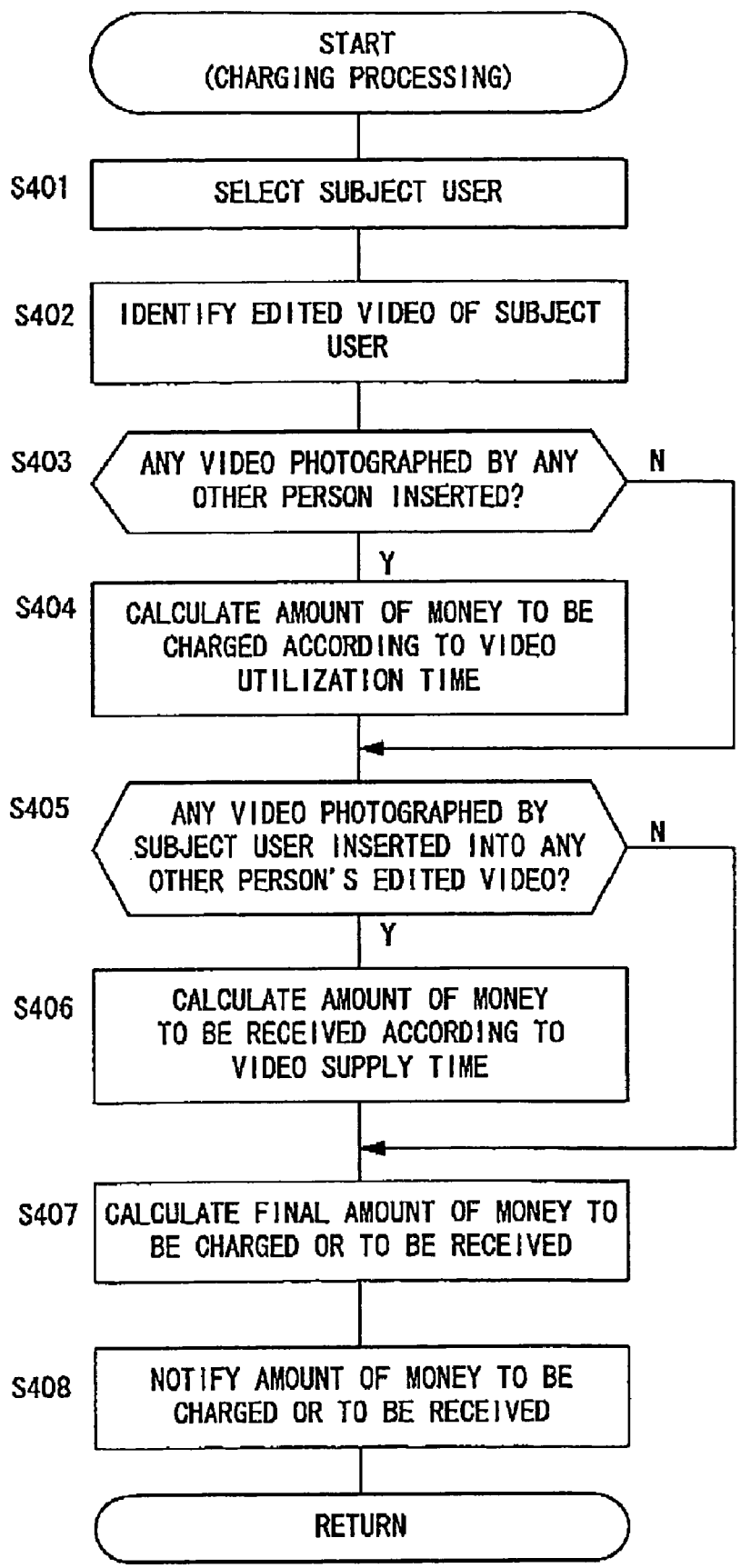
FIG. 7 is a flow chart of processing that is executed for charging processing.

Next the flow chart of FIG. 7, which is executed by the charging module 104e during the charging processing of the step S400 of FIG. 3, will be explained. In a step S401, a user is selected to be the subject of charging processing. The selection of this user may be performed by, for example, selecting as the subject user a parent who is a user, and who has designated his own child as the subject for editing and has prepared an edited video by the video editing processing described above. Or, it would also be acceptable to arrange to select all of the users who have supplied edited video in order as being the subject user, and to execute the processing of the step S402 and subsequently for all of these users in sequence. And in a step S402 the edited video that was prepared for the subject user who was selected in the step S401 is identified.

In a step S403, a decision is made as to whether or not, in the edited video identified in the step S402 that was prepared for the subject user, any video was inserted that was photographed by some other person than the subject user selected in the step S401. If a video that was photographed by another person was inserted into any portion of the edited video that was prepared for the subject user, then the flow of control proceeds to a step S404. But on the other hand, if all of the edited video that was prepared for this subject user consists of video that was photographed by this subject user himself, and no video photographed by any other person was inserted therein, then the step S404 is not executed, but the flow of control is transferred to a step S405.

In the step S404, the total insertion time of the videos that are photographed by other persons and decided in the step S403 to have been inserted into the edited video of the subject user is obtained. In other words, the total of the lengths of time over which the videos photographed by other persons are utilized in the edited video of the subject user (i.e. video utilization time) is obtained. And calculation of an amount of money to be charged is performed according to this video utilization time. Here, for example, the amount of money to be charged may be calculated by multiplying a certain amount of money determined in advance by the number of time units for charging (at the rate of, for example, one yen per one second, or the like). By doing this, an amount of money to be charged to the subject user is calculated, and then the flow of control proceeds to the step S405.

In the step S405, a decision is made as to whether or not, in the edited videos that have been prepared for persons other than the subject user, in other words in all of the edited videos except for the edited video for the subject user who was identified in the step S402, any video that was photographed by this subject user has been inserted. If any video that was photographed by the subject user was inserted into the edited video of some other person, then the flow of control proceeds to a step S406. On the other hand, if no video that was photographed by the subject user was inserted into the edited video of any other person, then the step S406 is not executed, but the flow of control is transferred to a step S407.

In the step S406, the total insertion time of the video photographed by the subject user and decided in the step S405 to have been inserted into the edited videos of other persons is obtained. In other words, the total time period over which the video photographed by the subject user is supplied to the edited videos of other persons (i.e. video supply time) is obtained. And calculation of an amount of money to be received is performed according to this video supply time. Here, this amount of money to be received may be calculated, for example, by multiplying a certain amount of money determined in advance by the number of time units for payment (at the rate of, for example, one yen per one second, or the like). It should be understood that it would also be acceptable to arrange to provide a difference between the amount of money to be received by the subject user, and the amount of money to be charged to the users who have utilized that photographed video, so that this difference accrues as a fee to the system manager or the like. By doing the above, an amount of money to be received by the subject user is calculated, and then the flow of control proceeds to the step S407.

In the step S407, calculation of a final amount of money to be charged to the user, or to be received by the user, is performed on the basis of the amount of money to be charged that was calculated in the step S404, and the amount of money to be received that was calculated in the step S406. At this time, if the amount of money to be charged is greater than the amount of money to be received, then this excess is set as the final amount of money to be charged; while conversely, if the amount of money to be received is greater than the amount of money to be charged, then this excess is set as the final amount of money to be received. When the final amount of money to be charged to the subject user or the final amount of money to be received by the subject user has been calculated in this manner, then the flow of control proceeds to a step S408.

In the step S408, notification to the subject user of the amount of money to be charged to the subject user or the amount of money to be received by him, which was calculated in the step S407, is performed. Upon receipt of this notification of the final amount of money to be charged or the final amount of money to be received, according thereto, the user performs payment of the final amount of money to be charged or receipt of the final amount of money to be received, for example when he receives delivery of the edited video, or the like. Or, it would also be acceptable for the user to perform payment of the final amount of money to be charged or receipt of the final amount of money to be received via credit card settlement or bank transfer or the like. When this step S408 has been executed, the flow chart of FIG. 7 terminates. By executing the processing described above, the charging processing is performed.

According to this embodiment as explained above, the following advantageous operational effects may be obtained.

(1) The photographed videos that have been photographed by the plurality of cameras 103 are collected by the video collection processing that is executed by the video collection module 104c, and the photographic subjects who have been photographed in these photographed videos are identified, for each photographed video, by the video decision processing that is performed by the video editing module 104d (in the step S210). And it is arranged to record the photographed videos that have been collected, and to record the photographic subject information that specifies the photographic subjects who have been identified in the recording device 105 (in the steps S122 and S211), and thus to accumulate them in the recording device 105. Since this is done, it is possible to supply a system whose convenience of use is good, when a plurality of photographers in the same facility are sharing the videos that they have photographed, such as the videos that the parents of children, who have become photographers, have shot of their own children at a sports meeting.

(2) The positions of the photographic subjects and of the cameras that are positioned within the facility are identified (in the step S103), and this information is recorded in the recording device 105 (in the step S104). And, in the step S210, it is arranged for the photographic subjects who are photographed in the photographic videos to be identified, on the basis of the positions of the photographic subjects and the positions of the cameras that have been identified and recorded in this manner. Since this is done, it is possible to reliably specify the photographic subjects who are photographed in the various videos.

(3) It is arranged to install the plurality of IC tag receivers 102 in the facility, and, in the step S103, to identify the positions where the photographic subjects and the cameras are located within the facility, on the basis of the tag information on the IC tags 101 that the photographic subjects hold, as received by these IC tag receivers 102, and the positions of installation of the IC tag receivers 102 that have received this tag information. Since this is done, accordingly it is possible to obtain the positions where the photographic subjects and the cameras are located with good accuracy.

(4) The photographic information is collected from the plurality of cameras 103 (in the steps S121 and S122), and the range of photography of each of the cameras is calculated on the basis of this photographic information that has been collected (in the step S205). And the photographic subjects who are within these ranges of photography are identified (in the step S207) on the basis of the identified positions where the photographic subjects and the cameras are located, and the ranges of photography of the cameras that have been calculated. And, in the step S210, it is arranged to identify the photographic subjects who are photographed in each of the photographed videos, according to the photographic subjects within the ranges of photography that have been identified in this manner. Since this is done it is possible to identify the photographic subjects who have been photographed in an accurate manner.

(5) Furthermore, since it is arranged to detect the presence or absence of any photographic obstruction in the photographed videos (in the step S208), and to perform the identification of the photographic subjects in the step S211 on the basis of these decision results as well, accordingly it is possible to identify the photographic subjects who have been photographed with yet a further level of accuracy.

(6) Moreover, since it is arranged to decide whether the photographic state for each of the photographed videos is good or bad (in the step S209), and to perform the identification of the photographic subjects in the step S211 on the basis of the results of these decisions as well, accordingly it is possible to identify the photographic subjects who have been photographed with an even further level of accuracy.

(7) By the video editing processing that is executed by the video editing module 104d, a photographic subject who is to be taken as the subject of editing is selected (in the step S301), and a plurality of video portions in which the photographic subject who has been selected is photographed are extracted from among certain ones of the plurality of photographed videos that have been accumulated in the recording device 105 (in the steps S306, S311, and S312). And it is arranged to prepare (in the step S313) an edited video for the photographic subject who has been selected, by editing a video by sequentially inserting the plurality of video portions that have been extracted in this manner. Since this is done, it is possible to provide a system with which the convenience of use is good, when sharing videos that have been photographed in the same facility by a plurality of photographers, such as videos that the parents of children at a sports meeting have photographed of their own children.

(8) The positions where the various photographic subjects and the various cameras are in the facility are identified (in the step S103), and this information is recorded in the recording device 105 (in the step S104). And, on the basis of this information about the positions of the photographic subjects and the positions of the cameras that has been recorded, the photographic subjects who are photographed in each of the photographed videos are identified (in the step S210), and the photographic subject information that specifies these photographic subjects who have been identified is recorded (in the step S211). And it is arranged to decide, on the basis of this photographic subject information that has been recorded in this manner, whether or not a photographic subject who has been selected is photographed in any one of the photographed videos (in the steps S307 and S308), and, according to the result of this decision, in the step S311 or S312, to extract the video portion in which this photographic subject who has been selected is photographed. Since this is done, it is possible reliably to extract the video portions in which the photographic subject who has been selected is photographed.

(9) It is decided whether or not the present time point is still within a predetermined time interval from when the video changed over the previous time (in the step S304), and, if it is still within the predetermined time period, then the video portion from the reference time point that is currently selected until the next reference time point is extracted from the same photographed video as the previous time (in the step S306). Since, in this manner, it is arranged to extract a continuous video portion of length equal to or greater than the predetermined time period from the same photographed video, accordingly changing over of the video (i.e. changing over between cameras) in the edited video does not take place until at least this predetermined time period has elapsed, so that it is possible to prevent an edited video resulting in which changing over is too frequent, so that it is hard to view.

(10) It is arranged to decide whether or not the photographic subject who has been selected is photographed in any of the photographed videos (in the step S307), and, if that photographic subject is not photographed in any of the photographed videos, then a video portion is extracted (in the step S309) from an overall photographed video that has been determined in advance, and it is arranged, in the step S313, to insert this video portion in the edited video. Since this is done, it is possible to insert some appropriate video into the edited video, matched to the event, even if the photographic subject who is the subject of editing is not photographed in any of the videos that have been photographed.

(11) It is decided (in the step S308) whether or not the photographic subject who has been selected is photographed in a plurality of the photographed videos at the same time, and if the selected photographic subject has been photographed in a plurality of the photographed videos, then it is decided (in the step S310) to which of this plurality of photographed videos priority should be accorded. And it is arranged, in the step S312, to extract a video portion from that photographed video to which it is decided, in this manner, that priority should be accorded. Since this is done, even if the photographic subject who has been taken as the subject for editing is photographed in a plurality of the photographed videos, it is possible to extract a video portion from that one among those photographed videos, which is the most suitable.

(12) Since it is arranged to decide to which of the plurality of photographed videos priority should be accorded, on the basis of the positional relationship between the camera and the photographic subject, or on the basis of the image conditions of the various photographed videos, accordingly it is possible reliably to decide upon the most suitable one of the photographed videos, from which a video portion should be extracted.

(13) When selecting the photographic subject in the step S301, user information is registered in advance that specifies the correspondence relationship between the photographic subjects and the users, so that, when a request arrives from any one of the users to prepare an edited video, it is possible to select the photographic subject who is to be taken as being the subject of editing for this user, on the basis of this user information that is registered. By doing this, the subject for editing is designated without permitting this subject to be any person who has no relationship with the user, such as the child of some other user or the like, so that it is possible to prevent an unauthorized edited video of such a person from being prepared.

(14) The range of the photographic time points of the video portions that are extracted during the video editing processing is set as the video editing time period (in the step S302). At this time, it is possible to set the video editing time period on the basis of the information about the events on the program that is registered in advance. Since this is done, the user is able to set the video editing time period in a simple manner.

(15) By the charging processing that is executed by the charging module 104e, any one of the users is selected as a subject user (in the step S401), and an amount of money to be charged to that subject user for the edited video that has been prepared for that subject user is calculated (in the step S404). Moreover, it is arranged to calculate (in the step S406) an amount of money to be received by that subject user for the edited videos that have been prepared for users other than that subject user. Since this is done, it is possible to perform charging or reimbursement of the user, according to his usage of video photographed by other users, and according to his supply of photographed video to other users.

(16) In the step S404, it is arranged to calculate the amount of money to be charged to the subject user, according to the length of time of video photographed by other users that is inserted into the edited video prepared for that subject user. Since this is done, it is possible to calculate an appropriate amount of money to be charged, according to the state of usage of video photographed by other users.

(17) In the step S406, it is arranged to calculate the amount of money to be received by the subject user, according to the length of time of video photographed by that subject user that is inserted into the edited videos prepared for other users than that subject user. Since this is done, it is possible to calculate an appropriate amount of money to be received, according to the state of supply of photographed video to other users.

(18) It is arranged for a warning to be issued by the schedule management processing executed by the schedule management module 104b to the photographer for a photographic subject, among the plurality of photographic subjects who are present in the facility, who is soon to appear. Since this is done, accordingly, even without remembering the schedule of the event, the photographer is able reliably to photograph the photographic subject who is his objective without missing his photographic timing. As a result, it is possible to provide a system whose convenience of use is good when sharing videos that a plurality of photographers have photographed in the same facility, such as the videos that the parents of children at a sports meeting have shot of their own children.

(19) It is arranged to decide whether or not the present time is near the starting time for the next event on the program (in the step S112), and, at a predetermined time before the start of the next event on the program, to identify the photographic subject who is scheduled to appear in that program event (in the step S113); and, due to this, it is possible to determine the photographic subject who is going to appear soon. Since this is done, it is possible to determine the photographic subject who will soon appear, at an appropriate timing.

(20) It is arranged to identify, in the step S112, the photographic subject who is scheduled to appear in the next event on the program, on the basis of the registered participant information for each event on the program that is registered in advance. Since this is done, accordingly it is possible to simply and reliably identify the photographic subject who is scheduled to appear in the next event upon the program.

(21) When transmitting the warning information in the step S114, issue of the warning to the photographer may be performed by transmitting a control signal that commands the camera 103 to perform some specified operation. Or, when transmitting this warning in the step S114, the issue of the warning to the photographer may be performed by transmitting an email to the email address of the portable telephone held by the photographer, which is registered in advance. By either of these methods, it is possible to issue a warning to the photographer that is easy for him to understand.

It should be understood that while, in the embodiment described above, it is arranged for all of the videos that were photographed by the cameras 103 to be collected by the video collection module 104c and shared, it would also be acceptable to arrange for only those videos photographed by the users who agreed in advance to share, to be the subjects of this process. At this time, it is desirable to settle in advance, by some contractual clause, arrangements related to the ownership of the copyright in the photographed videos, the fact that video photographed by some other person cannot be utilized for any commercial objective, and so on. Or, it would also be acceptable to make it possible for the photographers to be able to select whether or not to share video at each time.

Moreover, it would also be acceptable to arranged for the photographed videos to be temporarily recorded in the cameras 103, and subsequently, in order for the photographed videos to be collected by the control device 104, for them to be transmitted to the control device 104 by the users from their own home personal computers or the like. At this time, it would also be acceptable to arrange for the users to be able to select which portions of their photographed videos should be transmitted to the control device 104 and shared.

While, in the embodiment described above, it is arranged for the processing sequences shown in the flow charts of FIGS. 4 through 7 all to be executed by the control device 104, it would also be acceptable to arrange for some portion thereof to be executed by the cameras 103. For example, it would also be possible for the information about the photographic subject positions and the camera positions that have been identified by the position identification processing to be sequentially transmitted from the control device 104 to each of the cameras 103, and for video decision processing as explained with reference to the flow chart of FIG. 5 to be executed by the cameras 103 on the basis of this information. If this is done, then, by the photographed videos and the photographic subject information being transmitted to the control device 104 from the cameras 103, it is possible for the video editing processing as shown in the flow chart of FIG. 6 to be executed by the video editing module 104d of the control device 104. It should be understood that, in this case, it would also be acceptable to arrange to embed the photographic subject information in the photographed video data as meta data.

While, in the embodiment described above, an example has been explained of the video sharing system in which parents at an event in a facility such as a kindergarten or a nursery school, elementary school, or the like become photographers and photograph his own children, and these photographed videos are shared, it can also be applied in other circumstances than the above. For example, the present invention could be applied to a case in which some subjects other than the photographers' own children were taken as photographic subjects, and it could be applied to usage in various types of facility, such as a park, a sports hall, an amusement park, a tourism facility or the like. Various other types of usage situation could also be contemplated.

Second Embodiment

Figure 12:
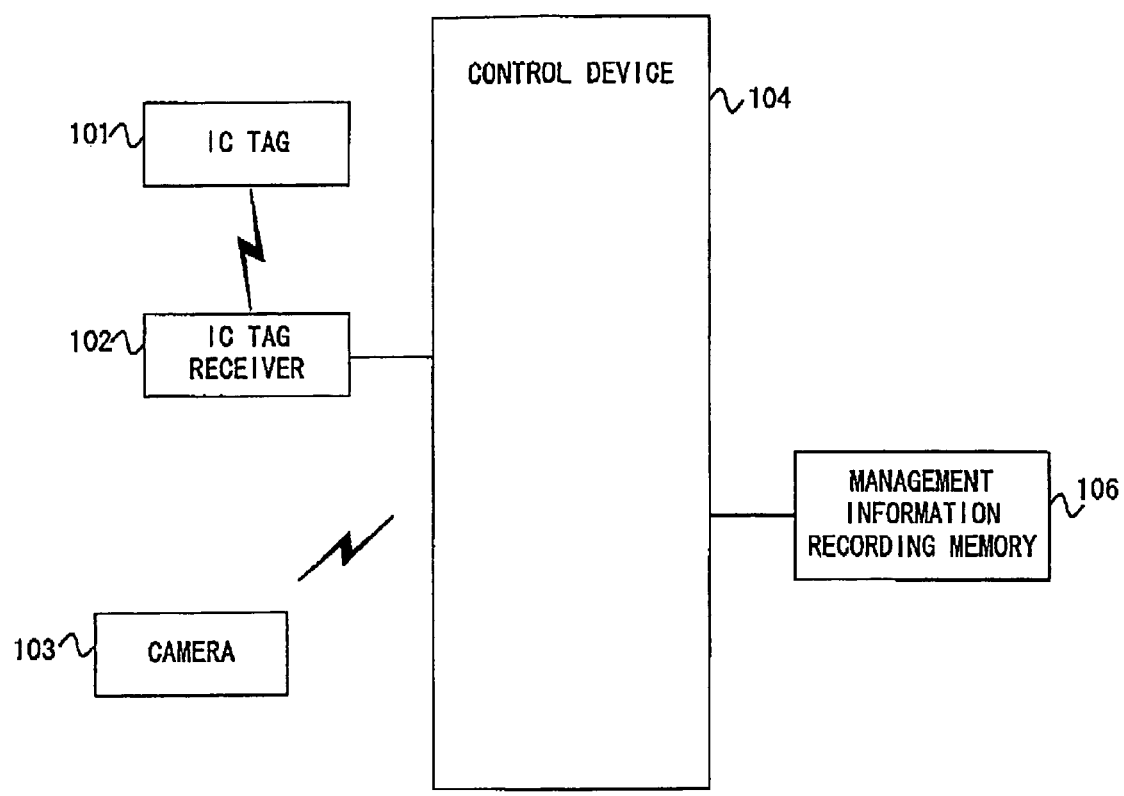
FIG. 12 is a block diagram showing a photography support system according to a second embodiment of the present invention.

FIG. 12 is a block diagram showing the structure of a photography support system according to a second embodiment of the present invention. This photography support system is one that makes it simple and easy for a photographer to find a specific photographic subject in a facility such as, principally, a kindergarten or nursery school or elementary school or the like. By using this photography support system, a parent at an event such as, for example, a sports meeting or the like, when he becomes a photographer to photograph his own child, is able simply and easily to find where his own child is located.

The photography support system 200 of FIG. 12 includes an IC tag 101, an IC tag receiver 102, a camera 103, a control device 104, and a management information recording memory 106. It should be understood that the IC tag receiver 102, the control device 104, and the management information recording memory 106 are installed to a facility in advance. On the other hand, the IC tag 101 and the camera 103 are supplied to a child and a photographer, who are users of this photography support system 200, by rental or sale.

As previously explained, each and every one of children who are to be subjects of photography with the camera 103 (kindergarten children, elementary school children, and so on) possesses one of the IC tags 101. For example, IC tags 101 may be installed upon their name tags, caps, shoes, kindergarten uniforms, gym suits or the like, so that these IC tags 101 are carried by the children due to the fact that they are wearing these items. Moreover, each and every photographer who possesses one of the cameras 103 (such as a parent or the like) also possesses an IC tag 101. In this case, it would be acceptable for these IC tags 101 to be installed upon the clothes of the photographers or the like, just as in the case of the children, or to be installed in the cameras 103. In other words, while in FIG. 12 one IC tag 101 is shown by a single block as a representative, actually this photography support system 200 includes a plurality of IC tags 101, corresponding to the number of children and photographers.

To each IC tag 101 there is allocated an intrinsic tag number for uniquely specifying that IC tag 101. This tag number is transmitted to the IC tag receiver 102 as a portion of the tag information. In other words, each of the IC tags 101 transmits tag information as identification information that is intrinsic to that tag.

It should be understood that the tag numbers of the IC tags 101 that are carried by a parent who is a photographer and by his child are registered in advance in the camera 103 that this photographer possesses. In concrete terms, a plurality of IC tags 101 and one camera 103 are supplied to the user by rental or sale, as a set. Among the plurality of IC tags 101 that are included in this set, one is for being held by a parent who is a photographer, while the remainder are for being held by children who are the subjects of photography. For this set, the tag numbers of the IC tags 101 that are included in the set are registered in advance in the camera 103. It should be understood that it would also be acceptable to arrange for the tag number of the IC tag 101 that is held by the photographer also to be registered as being one that corresponds to a photographic subject.

As previously described, the IC tag receivers 102 are installed at predetermined intervals in the facility in which this photography support system 200 is being used. In concrete terms, these receivers 102 are installed by being embedded in the ground of a play area or a school yard or the like, with predetermined gaps being left between them like the intersections upon a go board (for example at intervals of 1 meter apart). In other words, while in FIG. 12 one IC tag receiver 102 is shown by a single block as a representative, actually this photography support system 200 includes a plurality of such IC tag receivers 102. Moreover, a receiver number is allocated to each of the IC tag receivers 102 for uniquely identifying that IC tag receiver 102. And receiver management information is recorded in a management information recording memory 106 that will be described hereinafter, in which the installation position of each of the IC tag receivers 102 and its receiver number are held in mutual correspondence.

When a child or a photographer passes over any one of the IC tag receivers 102 that are installed, as described above, at predetermined intervals in a facility, this IC tag receiver 102 reads in by wireless communication the tag information from the IC tag 101 that this person who has passed over it is holding, and outputs this tag information and its own receiver number to the control device 104. In the control device 104, as will be described hereinafter, by identifying the tag number that is included in this tag information, and by moreover identifying the position of installation of this receiver on the basis of its receiver number, it is possible to identify the position where the person (in other words, the child or the photographer) who is holding this IC tag 101 is in the facility. To put this in another manner, it is possible to identify the position where a child who is a subject for photography is in the facility, or the position where a camera 103 that is being held by a photographer is in the facility, on the basis of the identification information intrinsic to each IC tag 101 that has been received by the IC tag receiver 102, and on the basis of the position of installation of that IC tag receiver 102 that has received this identification information from this IC tag 101.

Figure 13:
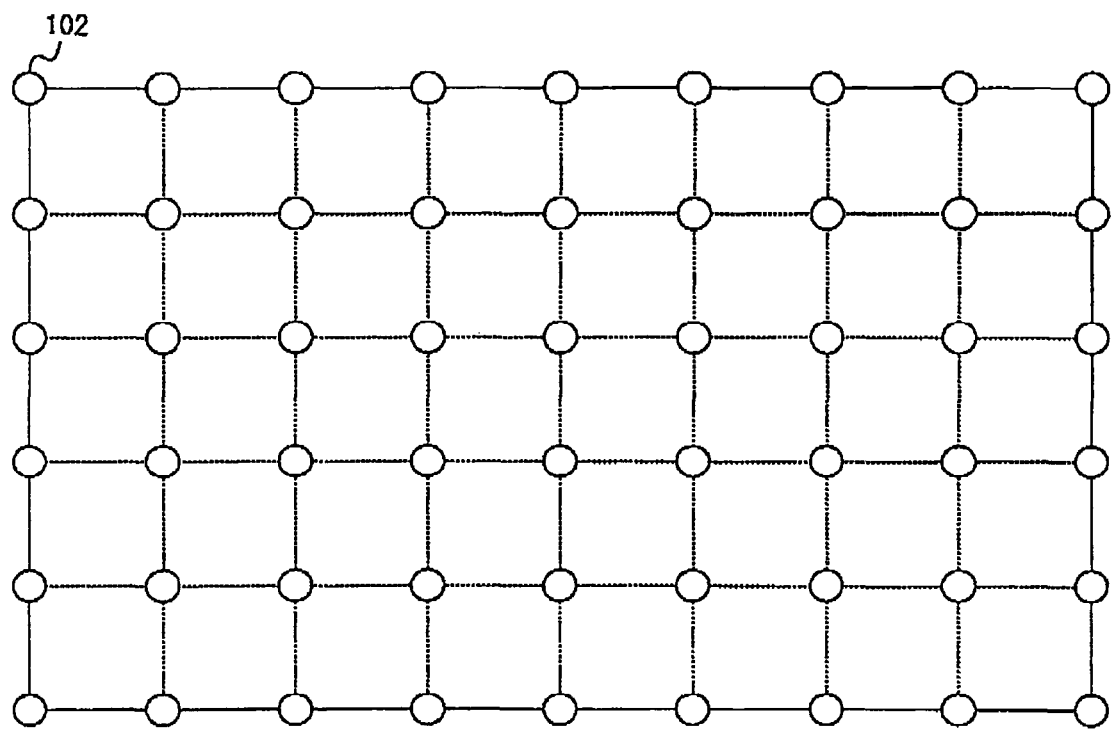
FIG. 13 is a figure showing another example of installation of IC tag receivers.

FIG. 13 is a figure like FIG. 2, showing an example of installation of IC tag receivers 102 in a play area or a schoolyard. In FIG. 13, the positions of installation of the IC tag receivers 102 are shown by white circles. In the example shown in this FIG. 13, the IC tag receivers 102 are installed in a facility at equal intervals. It should be understood that the intervals between the IC tag receivers 102 need not be equal intervals, as they are in FIG. 13.

The camera 103 performs photography according to actuation by the photographer, and records the resulting photographic image. Moreover, by the tag numbers of the IC tags in the same set registered in advance as previously described, in other words the tag numbers of the IC tags 101 that are held by each photographer (i.e. parent) and by each photographic subject (i.e. child) being transmitted to the control device 104, the camera 103 receives position information for the photographic subject and for the camera 103 itself from the control device 104. And the relative position of the photographic subject with respect to the camera 103 is calculated from this positional information that is received, and, on the basis of this positional information, by a method that will be described hereinafter, positional information for the photographic subject is supplied to the photographer by being displayed within the viewfinder.

It should be understood that, if a plurality of tag numbers are registered as tag numbers of IC tags 101 held by the photographic subjects, in other words if there are a plurality of children who are to be photographic subjects, then, by actuating the camera 103, the photographer selects the tag number, among this plurality of tag numbers, of the IC tag 101 held by the child whom he desires to be the photographic subject. In this manner, the child who is holding the IC tag 101 to which is allocated the tag number selected by the photographer is designated as the photographic subject, and that tag number is transmitted to the control device 104.

When as described above one of a plurality of children is to be designated as the photographic subject, it would also be acceptable to arrange for the child who is closest to the photographer to be preferentially designated as the photographic subject. Or, it would also be acceptable to arrange to register schedule information for the competition program of the sports meeting or the like in advance, to set where each child appears in that program, and for a child to be automatically designated as the photographic subject when the starting time of a competition in which that child will appear draws near. Moreover, it would also be possible to arrange to display a position map screen that shows the positional relationships of the plurality of children and the plurality of cameras. It should be understood that it would also be acceptable to display positional information upon a sub-screen of the liquid crystal display, or the like, for children who have not been designated as photographic subjects.

Furthermore, it is only possible for the photographer to designate a tag number that is registered in the camera 103 in advance as the tag number of the IC tag 101 that the photographic subject is holding, but tag numbers that are not registered cannot be thus designated. In other words, the photographic subject whose positional information is to be supplied to the photographer by the camera 103 is selected on the basis of the tag numbers that are registered in the camera 103 in advance. Due to this, along with a parent who is a photographer being able to designate his own child as the photographic subject without making any mistake, it also becomes impossible for him to designate the child of some other person without permission.

It should be understood that, if there are a plurality of photographers in the facility, then a camera 103 is possessed by each of these photographers. In other words, while in FIG. 12 one camera 103 is shown by a single block as a representative, actually this photography support system 200 includes a plurality of such cameras 103.

The control device 104 may be, for example, a computer device such as a personal computer or a server or the like, and is connected to the IC tag receivers 102 that are installed at a plurality of spots within the facility via a LAN or the like that is laid down within the facility. Moreover, the control device 104 is connected to the cameras 103 via a wireless communication line such as a wireless LAN or the like, and is also connected to the management information recording memory 106 via some interface.

When tag information and a receiver number are inputted from an IC tag receiver 102, this control device 104 identifies the position of installation of the IC tag receiver 102 that corresponds to the inputted receiver number on the basis of the receiver management information that is recorded in the management information recording memory 106 as explained above, and also identifies, on the basis of the inputted tag information, the tag number of the IC tag 101 that has transmitted this tag information. From the position of installation of the IC tag receiver 102 and the tag number of the IC tag 101 that have been identified in this manner, the control device 104 specifies where the person (a child or a photographer) who is holding this IC tag 101 to which this tag number is assigned is located within the facility. And the information about the location positions of the people that have been identified is recorded for each tag number, and, when a transmission of a tag number from a camera 103 arrives, in response thereto, the location position of the person who corresponds to this tag number is transmitted to the camera 103.

Figure 14:
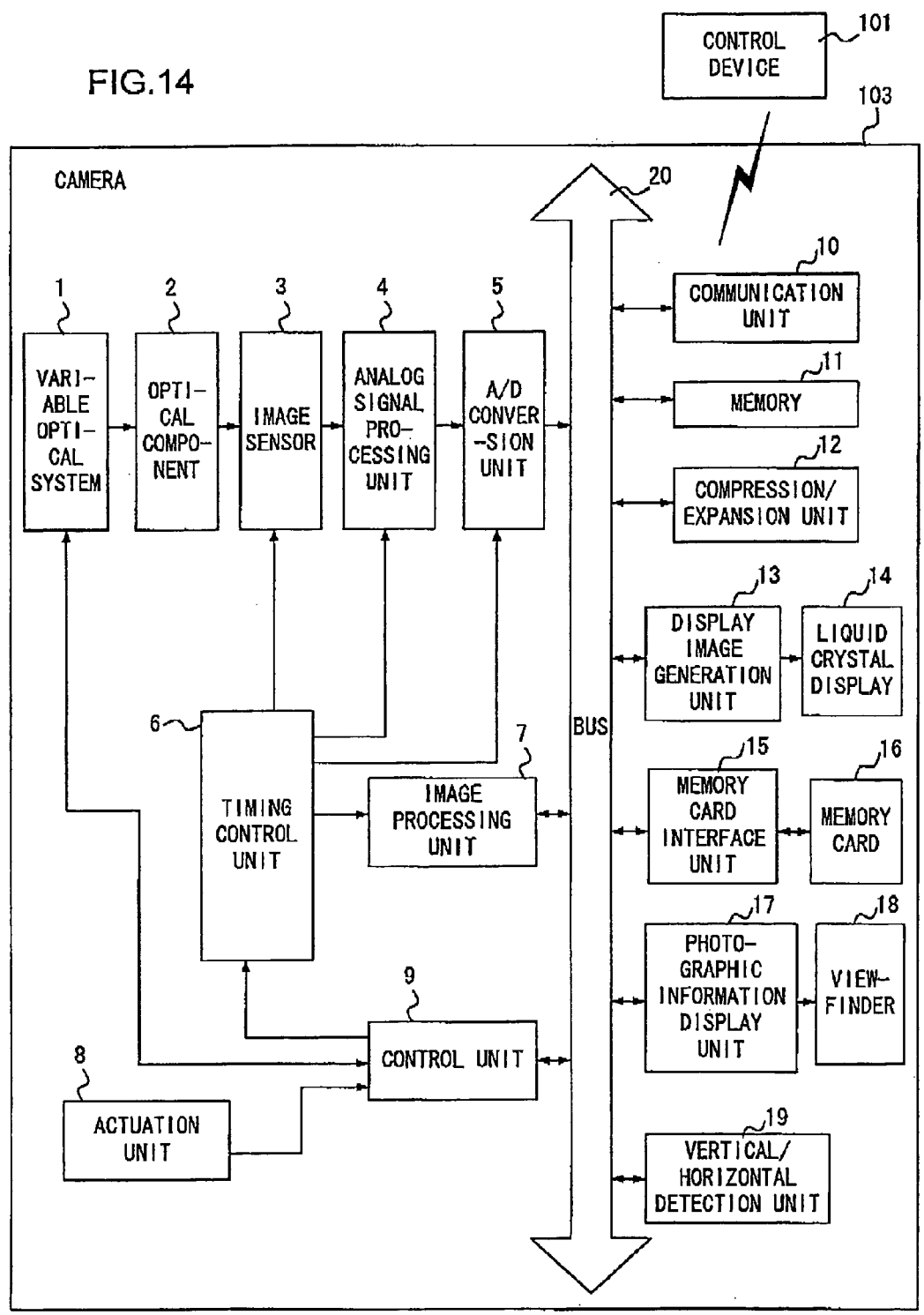
FIG. 14 is a block diagram showing the structure of a camera in this photography support system according to the second embodiment of the present invention.

Next, the structure of the camera will be explained with reference to the block diagram of FIG. 14. This camera 103 includes a variable optical system 1, an optical component 2, an image sensor 3, an analog signal processing unit 4, an A/D conversion unit 5, a timing control unit 6, an image processing unit 7, an actuation unit 8, a control unit 9, a communication unit 10, a memory 11, a compression/expansion unit 12, a display image generation unit 13, a liquid crystal display 14, a memory card interface unit 15, a photographic information display unit 17, a viewfinder 18, and a vertical/horizontal detection unit 19. Among these various elements, the A/D conversion unit 5, the image processing unit 7, the control unit 9, the communication unit 10, the memory 11, the compression/expansion unit 12, the display image generation unit 13, the memory card interface unit 15, the photographic information display unit 17, and the vertical/horizontal detection unit 19 are mutually connected together via a bus 20.

The variable optical system 1 includes a photographic lens that consists of a plurality of optical lens groups, an aperture, a shutter, and so on. The focal distance of the photographic lens of this variable optical system 1 is adjusted according to control by the control unit 9. The optical component 2 consists of an optical filter or a cover glass or the like. By a ray bundle from the photographic subject passing through the variable optical system 1 and the optical component 2, an image of the photographic subject is formed upon the image sensor 3.

The image sensor 3 captures an image of the photographic subject that is imaged by the variable optical system 1, and outputs an image signal (an imaging signal) that corresponds to this captured image of the photographic subject. This image sensor 3 has an image capturing region of a rectangular shape that consists of a plurality of pixels, and outputs to the analog signal processing unit 4 an image signal that is an analog signal corresponding to the electric charges accumulated by each of the pixels, in sequence by pixel units. The image sensor 3 may, for example, consist of a single chip type color CCD (Charge Coupled Device) or the like.

The analog signal processing unit 4 internally includes a CDS (Correlated Double Sampling) circuit and an AGC (Auto Gain Control) circuit and the like, and performs predetermined analog processing upon the image signal that is inputted. And the A/D conversion unit 5 converts this image signal that has been processed by the analog signal processing unit 4 into digital image data.

The timing control unit 6 is controlled by the control unit 9, and controls the timing of the various operations by the image sensor 3, the analog signal processing unit 4, the A/D conversion unit 5, and the image processing unit 7. The image processing unit 7 consists of, for example, a dedicated image processing single chip microprocessor, and performs predetermined image processing upon the image data that has been converted from the image signal by the A/D conversion unit 5.

And the actuation unit 8 includes actuation buttons and switches of various types. The output from this actuation unit 8 is inputted to the control unit 9 by which the details of the actuation are recognized.

The communication unit 10 performs predetermined communication processing such as format conversion and encoding upon data, modulation and demodulation, frequency conversion, and so on, and performs wireless communication with the control device 104. By this wireless communication, the tag numbers of the IC tags 101 that, as previously described, are held by the photographer and the photographic subject are transmitted to the control device 104, and the positional information for the photographic subject and the camera 103 returned from the control device 104 in response thereto are received.

A flash memory is used as the memory 11, and stores software for controlling the camera 103, and the tag numbers of the IC tags 101 within the same set registered in the camera 103 in advance as previously described. These tag numbers that are recorded in the memory 11 are transmitted to the control device 104 as tag numbers of the IC tags 101 that are held by the photographer and the photographic subject. According to requirements, the compression/expansion unit 12 performs predetermined compression processing or expansion processing upon the image data. It should be understood that this compression processing is processing for compressing the volume of data in the image data, while this expansion processing is processing for returning the data volume of image data that has been compressed to its original data volume.

The display image generation unit 13 creates an image for being displayed upon the liquid crystal display 14. The liquid crystal display 14 displays the image that has been created by the display image generation unit 13. Due to this, actuation screens of various types are displayed corresponding to the actuation state of the camera 103, and a replay image is displayed based upon the image of the photographic subject that has been captured by the image sensor 3, or upon image data stored in the memory card 16.

The memory card interface unit 15 provides an interface with a memory card 16 (a removable memory in card form) that is loaded into the camera 103. This memory card 16 is a non-volatile memory for recording image data, which can be fitted and removed. Images that have been photographed by the camera 103 are recorded by image data that has been generated during photography being recorded upon the memory card 16.

The photographic information display unit 17 displays in the viewfinder 18 various types of information related to photography, such as, for example, shutter speed, aperture value, auto focus area, and so on. A viewfinder image is displayed on the viewfinder 18, and is the same as the image of the photographic subject imaged upon the image sensor 3. The photographer is able to check the composition during photography upon this viewfinder image. Moreover, information related to photography such as that described above is displayed in the viewfinder 18 by the photographic information display unit 17. Among this information, the auto focus area is displayed as overlaid over the viewfinder image. Due to this, a focus adjustment region is displayed during photography, so that the photographer is able to know upon which portion of the photographic subject image the focus adjustment is being performed.

As one of the previously described items related to photography, the photographic information display unit 17 displays the position information for the photographic subject in the viewfinder 18 based upon the relative position of the photographic subject with respect to the camera 103. The details of this display of the position information for the photographic subject will be described hereinafter in detail. It should be understood that the relative position of the photographic subject with respect to the camera 103 is calculated according to the position information for the photographic subject and the position information for the camera 103 itself that are received from the control device 104 as previously described. And the vertical/horizontal detection unit 19 detects whether the camera 103 is oriented in the vertical direction or the horizontal direction. The result of this detection is outputted to the control unit 9.

With the camera 103 having a structure such as that described above, when shutter actuation is performed in a state in which photography is possible, the control unit 9 controls the variable optical system 1 to adjust focusing state, and performs timing control for the image sensor 3, the analog signal processing unit 4, and the A/D conversion unit 5 via the timing control unit 6, and thereby performs photography of the photographic subject. It should be understood that it would also be acceptable to make it possible to select a plurality of photographic modes according to the type of the photographic subject and the like, and to change the timing control according to the photographic mode.

The image sensor 3 generates an image signal that corresponds to the image of the photographic subject imaged upon the image capture region by the variable optical system 1. Certain analog signal processing is performed upon this image signal by the analog signal processing unit 4, and the image signal after analog processing is outputted to the A/D conversion unit 5. The image signal after analog processing is digitized by the A/D conversion unit 5, and then is supplied to the image processing unit 7 as image data.

The image processing unit 7 performs image processing such as interpolation, tone conversion, contour accentuation and so on upon the image data that has been supplied as described above. When this type of image processing has been completed, and after having been subjected to certain compression processing by the compression/expansion unit 12 according to requirements, the image data is recorded upon the memory card 16 via the memory card interface unit 15 as photographed image data. It should be understood that it will be supposed that interpolation processing has been completed upon this photographed image data upon which image processing has been completed, so that color information for each of the RGB color components is present for each pixel thereof. The photographed image is acquired as explained above, and the photographed image data thereof is recorded upon the memory card 16.

Figure 15:
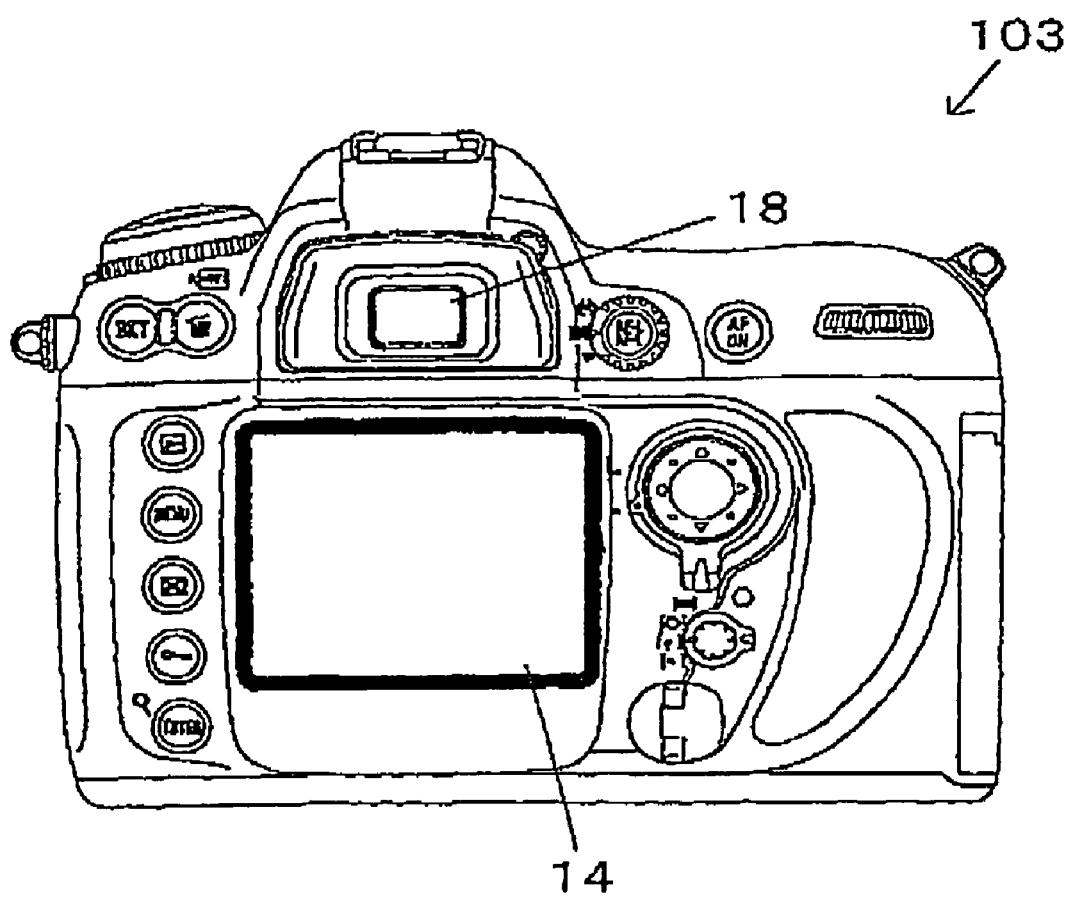
FIG. 15 is a figure showing an example of the external appearance of this camera as seen from its rear.

FIG. 15 is an example of a figure showing the external appearance of the camera 103, as seen from its rear. The liquid crystal display 14 and the viewfinder 18 are disposed upon the rear surface of the camera 103. The photographer is able to check the composition during photography by the viewfinder image that he can see when looking through the viewfinder 18. It should be understood that, although actuation buttons and actuation switches of various types that constitute the actuation unit 8 are disposed upon the rear surface of the camera 103, explanation thereof will here be omitted.

Figure 16:
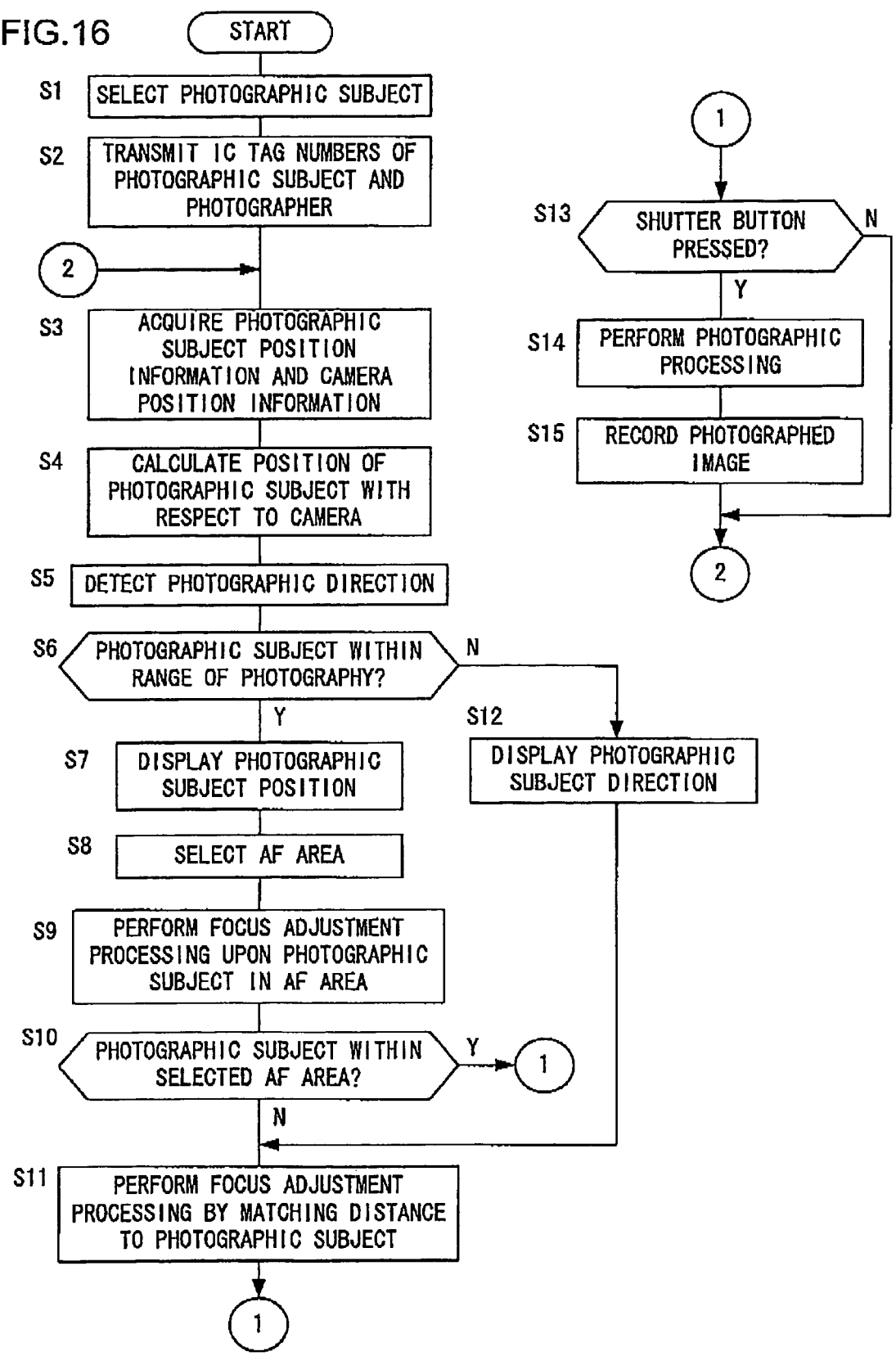
FIG. 16 is a flow chart showing processing executed by the camera in the photography support system according to the second embodiment of the present invention.

FIG. 16 is a flow chart showing processing executed by the camera 103, when photography is being performed with the camera 103 using this photography support system 200. This processing is executed by the control unit 9 of the camera 103.

In a step S1, a photographic subject is selected. FIG. 17 shows an example of a screen that is displayed upon the liquid crystal display 14 during this selection of a photographic subject in the step S1. In this screen example of FIG. 17, the tag numbers "ID1001" and "ID1002" are displayed, which are the numbers of those IC tags 101 held by children to be set as photographic subjects, among the tag numbers registered in advance in the camera 103. Selection of a photographic subject is performed by the photographer selecting any one of these tag numbers. In other words, in this example, each of two children is holding an IC tag 101, and either one of these two children may be selected by the photographer as the photographic subject. It should be understood that it would be acceptable to arrange to omit the processing of this step S1 if there is only one child who is holding an IC tag 101.

In a step S2, using the communication unit 10, the tag number of the IC tag 101 held by the photographic subject who has been selected in the step S1 and the tag number of the IC tag 101 that is held by the photographer are transmitted to the control device 104. These tag numbers are recorded in the memory 11, as previously described.

In a step S3, the photographic subject position information and the camera position information are acquired by receiving, using the communication unit 10, the position information for the photographic subject and for the camera 103 transmitted from the control device 104 according to the tag numbers that were transmitted in the step S2. At this time, the control device 104 transmits the location position of each of the tag numbers that has been identified to the camera 103 as the photographic subject position information and the camera position information, on the basis of the tag information and the receiver number that were inputted from an IC tag receiver 102, as previously described. In other words, when the tag number of the IC tag 101 that is held by the photographic subject who was selected in the step S1 is transmitted from the camera 103 in the step S2, in response thereto, the information about the position where that tag number is located is transmitted from the control device 104. The photographic subject position is given by this location position. Similarly, when the tag number of the IC tag 101 that is held by the photographer is transmitted from the camera 103 in the step S2, in response thereto, the information about the position where that tag number is located is transmitted from the control device 104. The camera position is given by this location position.

In a step S4, the relative position of the photographic subject with respect to the camera 103 is calculated on the basis of the photographic subject position information and the camera position information that have been acquired in the step S3. In other words, the position of the camera 103 is taken as a reference point, and the direction in which the photographic subject is located as seen from this reference point and the magnitude of the distance to the photographic subject from this reference point are obtained.

It should be understood that it would also be acceptable to arrange for the processing of the steps S3 and S4 described above to be executed by the control device 104. In other words, in the step S2, the camera 103 would transmit the tag numbers of the IC tags 101 held by the photographic subject and by the photographer to the control device 104. And the control device 104 would identify the positions of the photographic subject and of the camera 103 by these tag numbers, would calculate the relative position of the photographic subject with respect to the camera 103 from the relationship between these positions, and would transmit the result of this calculation to the camera 103. This method of procedure would be an acceptable alternative.

In a step S5, the photographic direction of the camera 103 is detected. For example, the photographic direction may be detected by detecting in which direction the camera 103 is oriented by using an azimuth detection sensor or an attitude detection sensor or the like, internal to the camera 103. It should be understood that it is not necessary to detect the photographic direction of the camera in three dimensions; it will be sufficient to ascertain along what bearing the camera 103 is pointing, in other words the photographic direction with respect to a horizontal plane.

In a step S6, a decision is made as to whether or not the photographic subject is present within the range of photography of the camera 103, on the basis of the relative position of the photographic subject that has been calculated in the step S4, and the photographic direction that was detected in the step S5. At this time, the range of photography is supposed to be some predetermined range that is centered upon the photographic direction detected in the step S5, and that is determined on the basis of the angle of view of the camera 103 and the zoom amount of the photographic lens and the like. Thus, by making a decision as to whether or not the photographic subject is positioned in this direction within this range of photography, a decision is made as to whether or not the photographic subject is present within the range of photography. It should be understood that, if only the photographic direction with respect to a horizontal plane was detected in the step S5, then it will be acceptable for the camera 103 to be pointed horizontally by the photographer. If the result of the above decision is that the photographic subject is present within the range of photography, then the flow of control proceeds to a step S7, whereas if the photographic subject is not present within the range of photography, then the flow of control is transferred to a step S12. In the following, the case in which the flow of control has proceeded to the step S7 will be explained.

If the flow of control has proceeded from the step S6 to the step S7, in other words if the photographic subject is within the range of photography, then, in the step S7, this position of the photographic subject within the range of photography is displayed. Here, this display of the photographic subject position is performed by displaying an auto focus area in a position that corresponds to the photographic subject in the viewfinder 18.

An example of display of the photographic subject position in the viewfinder 18 is shown in FIG. 18. FIG. 18(a) is an example of display when a photographic subject 30 is positioned in the vicinity of the center of the range of photography; FIG. 18(b) is an example of display when the photographic subject 30 is positioned in the vicinity of the right edge of the range of photography; and FIG. 18(c) is an example of display when the photographic subject 30 is positioned somewhat to the left from the center of the range of photography. In this manner, the position of the photographic subject 30 within the range of photography is displayed by displaying auto focus areas 31 matched to the position of the photographic subject 30 in a vertical column, overlapped over the viewfinder image. It should be understood that, in order to make it clear that the auto focus areas 31 that are displayed at this time are not ones that are indicating focus adjustment regions during photography, it is desirable to provide them in a different display format, for example by displaying them in a different color from when regions are being indicated for focus adjustment, or by displaying them as blinking.

In a step S8, selection of an auto focus area for focus adjustment is performed. Here, the auto focus area that was displayed in the step S7 for indicating the position of the photographic subject is selected as the auto focus area for focus adjustment. And in the next step S9, focus adjustment is performed upon the photographic subject within the auto focus area that was selected in the step S8. For example, the distance to the photographic subject is calculated for each of the auto focus areas in the vertical column in FIG. 18, and focus adjustment is performed by adjusting the focus for the one that is closest to the distance from the camera 103 to the photographic subject, as calculated in the step S4.

In a step S10, on the basis of the result of the focus adjustment processing of the step S9, a decision is made as to whether or not the photographic subject is present in the auto focus area that was selected in the step S8. For example, in a case such as when the distances to the photographic subject for each of the auto focus areas that were obtained during the focus adjustment in the step S9 are all greatly different from the distance from the camera 103 to the photographic subject that was obtained when calculating the position of the photographic subject in the step S4, it is decided that the photographic subject is not present in the auto focus area that has been selected, and the flow of control proceeds to a step S11. However if this is not the case, then it is decided that the photographic subject is present in the auto focus area that has been selected, and the flow of control is transferred to a step S13.

If the flow of control has proceeded from the step S10 to the step S11, then, in this step S11, focus adjustment is performed by matching the focus to the distance from the camera 103 to the photographic subject, which was obtained during the calculation of the photographic subject position in the step S4. In this manner, if in the step S10 it has been decided that the photographic subject is not present in the auto focus area that has been selected, then focus adjustment is performed on the basis of the relative position of the photographic subject, which was calculated according to the photographic subject position information and the camera position information that were received from the control device 104. Due to this, it is possible to adjust the focus of the camera 103 in an appropriate manner, even if the photographic subject is not present within any auto focus area. When the step S11 has been executed, the flow of control is transferred to a step S13.

In this step S13, a decision is made as to whether or not the shutter button has been depressed by the photographer If the shutter button has been depressed then the flow of control proceeds to a step S14, and, after having performed photographic processing and having acquired a photographed image in this step S14, this photographed image is recorded upon the memory card 16 in the next step S15. Photography with the camera 103 is performed in this manner. After the step S15 has been executed the flow of control returns to the step S3, and the processing described above is repeated.

On the other hand if, for longer than some predetermined time interval, the shutter button has not been depressed in the step S13, then the processing of the steps S14 and S15 is not performed, but rather the flow of control returns to the step S3, and the processing described above is repeated. Due to this, the display of the photographic subject position is updated each time that this predetermined time interval elapses.

Next, the case when the flow of control has been transferred from the step S6 to the step S12 will be explained. In this case, i.e. if the photographic subject is not present within the range of photography, then in the step S12 the direction of the photographic subject with respect to the range of photography is displayed. Here, the display of the direction to the photographic subject who is outside the range of photography is performed by displaying an arrow sign in the viewfinder 18 that shows the direction to the photographic subject.

Examples of such display of the photographic subject direction in the viewfinder 18 are shown in FIG. 19. FIG. 19(a) is an example of display when the photographic subject is positioned on the right with respect to the range of photography, whereas FIG. 19(b) is an example of display when the photographic subject is positioned on the left with respect to the range of photography. The position (i.e. the direction) of a photographic subject who is outside the range of photography may be displayed by displaying an arrow sign 32 in the direction in which the photographic subject is positioned with respect to the range of photography in this manner. It would also be acceptable, at this time, to arrange to convey how far away the photographic subject is removed from the range of photography, by changing the blinking speed of the arrow sign 32 according to this amount of separation.

It should be understood that it would also be acceptable to display the direction of the photographic subject, not by using the arrow sign 32 of FIG. 19, but rather by using the auto focus area. In this case, it is desirable for the display format to be different from that employed in the step S8 when displaying a photographic subject who is within the range of photography.

Although, in FIG. 19, an example is shown in which the direction of the photographic subject is displayed when the camera 103 is oriented horizontally, it is necessary to provide a different display from the one of FIG. 19 when the camera 103 is oriented vertically, since the orientation of the viewfinder 18 is rotated through 90° in the rightwards or the leftwards direction. An example of display in this case is shown in FIG. 20. FIG. 20(a) is an example of display when the photographic subject is positioned on the right with respect to the range of photography, whereas FIG. 20(b) is an example of display when the photographic subject is positioned on the left with respect to the range of photography. At this time, the arrow sign 33 that is displayed in order to show the direction of the photographic subject is different from the arrow sign 32 of FIG. 19 that is displayed when the camera is oriented horizontally. In this manner, the display of the direction of the photographic subject in the viewfinder 18 is changed over to either vertical display or horizontal display, according to the orientation in which the photographer is pointing the camera 103. At this time, whether the photographer is orienting the camera 103 vertically or horizontally is detected by the vertical/horizontal detection unit 19 of FIG. 14.

Although, in the above, changing over between vertical display and horizontal display for display of the photographic subject direction in the step S12 has been explained, in a similar manner, in the step S7, it is possible to change over the display in the viewfinder 18 of the photographic subject position between vertical display and horizontal display. In other words, if the photographer is holding the camera 103 vertically, then, corresponding thereto, the display arrangement of the auto focus areas 31 is also changed, so as to display the auto focus areas 31 in a vertical column in the viewfinder 18 oriented vertically. It is desirable for this to be done.

After the step S12 has been performed, then, by transferring the flow of control to the step S11 and performing processing as previously described, focus adjustment is performed by matching the focus to the distance from the camera 103 to the photographic subject, which was obtained when the photographic subject position was calculated in the step S4. By doing this, it is possible to perform focus adjustment of the camera 103 in an appropriate manner, even if the photographic subject is present outside the range of photography.

According to the second embodiment as explained above, it is possible to obtain the following advantageous operational effects.

(1) By displaying, with the camera 103, the position or the direction of the photographic subject in the viewfinder 18 in the step S7 or the step S12 on the basis of the relative position of the photographic subject with respect to the camera 103, which is obtained in the step S4 on the basis of the tag information that is transmitted from the IC tag 101 as intrinsic identification information, it is arranged to supply the position information for this photographic subject to the photographer. Since this is done, when a photographer is looking for and photographing a specific photographic subject, as when a parent at a sports meeting is photographing his own child or the like, it is possible to support the photographer by supplying position information for this photographic subject.

(2) The plurality of IC tag receivers 102 are installed in the facility, and the location position of the photographic subject in the facility is identified by the control device 104 on the basis of the tag information of the IC tag 101 that the photographic subject possesses, which is received by one or more of these IC tag receivers 102, and the positions of installation of the IC tag receivers 102 that have received this tag information. And it is arranged for the information about the location position of the photographic subject and the location position of the camera 103, which are identified by the control device 104, to be acquired by the camera 103 (in the step S3), and for the relative position of the photographic subject with respect to the camera 103 to be obtained on the basis of this information (in the step S4). Since this is done, it is possible to obtain the positional information about the photographic subject that is supplied to the photographer with good accuracy.

(3) It is arranged for the location position of the camera 103 in the facility to be identified by the control device 104 on the basis of the tag information that is transmitted from the IC tag 101 held by the photographer and received by the IC tag receiver 102, and the position of installation of the IC tag receiver 102 that has received this tag information. Since this is done, it is possible to obtain the positional information about the photographic subject to be supplied to the photographer with yet better accuracy.

(4) It is arranged for the camera 103 to decide as to whether or not the photographic subject is within the range of photography (in the step S6), and to change the position information for the photographic subject to be supplied to the photographer according to the result of this decision. In concrete terms, it is arranged, if it is decided that the photographic subject is within the range of photography, to display the position of the photographic subject in that range of photography (in the step S7); but, if it is decided that the photographic subject is not within the range of photography, to display the direction of the photographic subject with respect to that range of photography (in the step S12). Since this is done, it is possible to supply position information for the photographic subject with more appropriate details, according to whether the photographic subject is within the range of photography or is outside that range.

(5) Since it is arranged, when displaying the position of a photographic subject who is within the range of photography in the step S7, to provide this display by using a portion of the auto focus area that is displayed as overlapped over the viewfinder image, accordingly it is possible to supply this display in a manner that is easy to see and easy to understand during photography.

(6) Since it is arranged, when displaying the direction of the photographic subject with respect to the range of photography in the step S12, to display a sign that indicates this direction in the viewfinder, accordingly it is possible to supply this display in a manner that is easy to see and easy to understand during photography.

(7) It is arranged, when displaying the position or the direction of the photographic subject in the step S7 or the step S12, to change over to either vertical display or horizontal display, according to the orientation in which the photographer is holding the camera 103. Since this is done, it is possible to provide a display that is easy to see, whether the camera 103 is being held in vertical or in horizontal orientation.

(8) It is arranged to perform focus adjustment of the camera 103 (in the step S11) on the basis of the relative position of the photographic subject obtained in the step S4. At this time it is arranged, if the photographic subject is within the range of photography, to perform normal focus adjustment using an auto focus area that is matched to this photographic subject who is within the range of photography (in the step S9); whereas, if the photographic subject is not within the range of photography, then it was arranged to execute the processing of the step S11. Since this is done, it is possible to adjust the focus of the camera 103 in an appropriate manner, even if the photographic subject is present outside the range of photography.

(9) It is arranged to select the photographic subject whose position information is supplied to the photographer by the camera 103 on the basis of the information about the tag number of the IC tag 101 possessed by the photographic subject, which is registered in advance in the camera 103. Since this is done, it is possible for a parent who is a photographer to designate his own child as the photographic subject without making any error and to ensure that he cannot designate the child of some other person as the photographic subject without permission.

Embodiment Three

Figure 21:
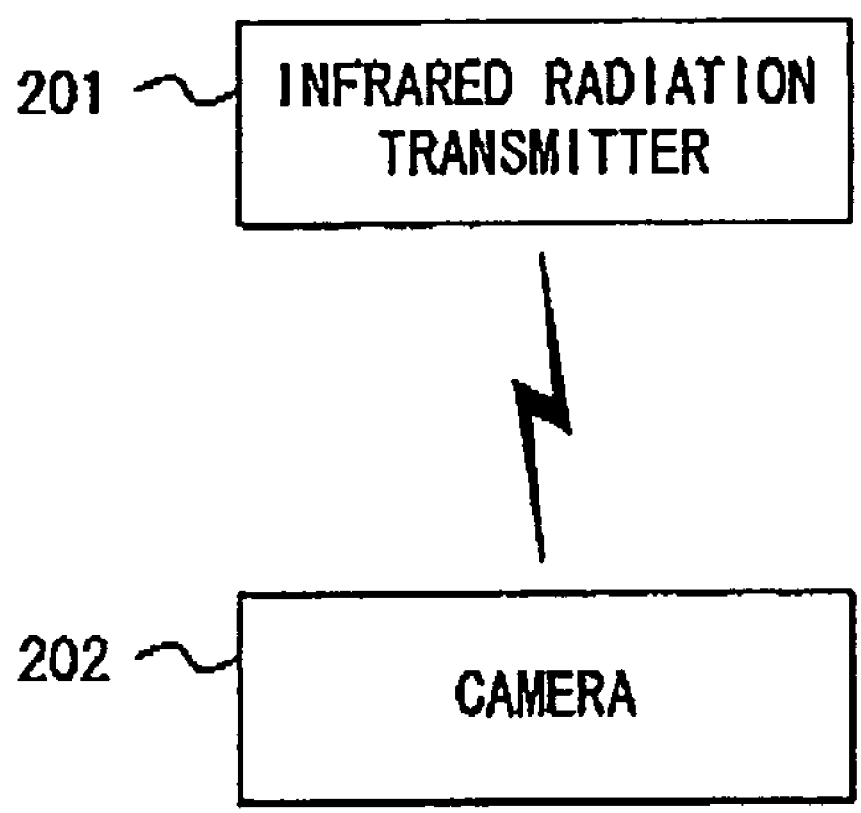
FIG. 21 is a block diagram showing the structure of a photography support system according to a third embodiment of the present invention.

Next, a photography support system according to an embodiment of the present invention, which is different from the embodiment explained above, will be explained. FIG. 21 is a block diagram showing the structure of the photography support system according to this embodiment. This photography support system 300 includes an infrared radiation transmitter 201 and a camera 202.

The infrared radiation transmitter 201 is used instead of the IC tag 101 shown in FIG. 12, and each and every one of the children who is a photographic subject for the camera 202 possesses such as transmitter 201, just as was the case for the IC tags 101. It should be understood that, in this embodiment, the infrared radiation transmitters 201 need only be held by the photographic subjects; but the photographers need not hold them In other words, while in FIG. 21 one infrared radiation transmitter 201 is shown by a single block as a representative, actually this photography support system 300 includes a plurality of such infrared radiation transmitters 201, corresponding to the number of children. Unique identification numbers are allocated to these infrared radiation transmitters 201, just as was the case for the IC tags 101. An infrared signal that includes this identification number is transmitted to the camera 202 at predetermined time intervals. In other words, each of the infrared radiation transmitters 201 transmits an infrared signal as its unique identification information.

This camera 202 is a camera possessed by a photographer, like the camera 103 shown in FIG. 12, and, upon actuation by the photographer, performs photography and records the resulting photographed image. Moreover, by receiving the infrared signal transmitted from the infrared radiation transmitter 201, this camera 202 recognizes the identification number allocated to that infrared radiation transmitter 201, and also detects the direction from which the transmission of that infrared signal arrived. Due to this, it is possible to detect in what direction the photographic subject is positioned with respect to the camera 202. And, in a similar manner to that explained in the above description for the second embodiment, the direction of the photographic subject is provided to the photographer by being displayed in the viewfinder. It should be understood that, if a plurality of photographers are present within the facility, then one of these cameras 202 is held by each of the photographers. In other words, while in FIG. 21 only one camera 202 is shown by a single block as a representative, actually this photography support system 300 may sometimes include a plurality of such cameras 202.

As has been explained above, this photography support system 300 includes a plurality of infrared radiation transmitters 201 and cameras 202, and it is not necessary to install any special system in the facility in advance, as with the IC tag receivers 102, the control device 104 and the management information recording memory 106 shown in FIG. 12. Due to this, it is possible to set up this photography support system at a lower cost than that of the photography support system 200 explained in the second embodiment.

Next, the structure of this camera 202 will be explained with reference to the block diagram of FIG. 22. This block diagram is the same as the block diagram of FIG. 14 for the camera 103, except for the point that the communication unit 10 has been replaced by an infrared radiation reception unit 10a. Accordingly, in the following, only this infrared radiation reception unit 10a will be explained, and explanation of the other structures will be omitted.

The infrared radiation reception unit 10a receives the infrared signals transmitted from the infrared radiation transmitter 201. The infrared signal that has been received by the infrared radiation reception unit 10a is outputted to the control unit 9, and the identification number that is allocated to the infrared radiation transmitter 201 having transmitted this infrared signal is recognized by the control unit 9. Moreover, the infrared radiation reception unit 10a detects the direction from which this infrared signal transmission has arrived, in other words the direction of the infrared radiation transmitter 201. For this, the infrared radiation reception unit 10a includes a CCD that consists of a plurality of pixels, similarly to the image sensor 3, and an infrared lens or the like for forming an image upon this CCD.

FIG. 23 is a flow chart showing processing executed by the camera 202 when photography is being performed with the camera 202 using this photography support system 300. This processing is performed by the control unit 9 of the camera 202.

In a step S21, the photographic subject is selected by a similar method to the one explained in the step S1 of FIG. 16. In the next step S22, the infrared signal that is transmitted from the infrared radiation transmitter 201 held by the photographic subject who has been selected in the step S21 is received using the infrared radiation reception unit 10a. At this time it is distinguished, according to the identification number included in this infrared signal, whether or not this infrared signal received by the infrared radiation reception unit 10a is one that has been transmitted from the infrared radiation transmitter 201 held by the photographic subject who has been selected. Due to this, it is arranged only to use the corresponding infrared signal, and not to use any other infrared signal. In other words, the processing subsequent to the step S22 is only executed on the basis of an infrared signal including the identification number that was selected during the selection of the photographic subject, and other infrared signals are ignored, even if they are received.

In the step S23, on the basis of the infrared signal that was received in the step S22, the direction of the photographic subject with respect to the camera 202 is calculated as the relative position of this photographic subject with respect to the camera 202. Here, the direction of the photographic subject is obtained from the direction of transmission of the infrared signal that is detected by the infrared radiation reception unit 10a. It should be understood that in this step S23 the relative direction of the photographic subject is calculated with respect to a reference axis of the camera 202 (for example, the central axis of the lens); and this is different from what happens in the step S4 of FIG. 16. In other words, the direction that the photographic subject is displaced from the reference axis of the camera 202 is obtained.

In a step S24, a decision is made as to whether or not the photographic subject is within the range of photography of the camera 202, on the basis of the direction of the photographic subject that was calculated in the step S23. This decision is different from the decision in the step S6 of FIG. 16, in which it is performed without using the photographic direction of the camera 202. In other words, if the lens central axis is taken as being the reference axis of the camera 202, it is obtained in the step S23, to what extent the photographic subject is displaced from the direction of the central axis of the lens. It is possible to make a decision as to whether or not the photographic subject is within the range of photography, by making a decision as to whether or not this range of the direction of the photographic subject with respect to the central axis of the lens is within a range for photography, which is determined on the basis of the angle of view of the camera 202 or the zoom amount of the photographic lens or the like. If the result of this decision is that the photographic subject is within the range of photography, then the flow of control proceeds to a step S25, whereas if the photographic subject is not within the range of photography, then the flow of control is transferred to a step S28.

If the flow of control has been transferred from the step S24 to the step S25, then, in the steps S25, S26, and S27, similar processing is performed to that of the steps S7 through S9 of FIG. 16. In other words, in the step S25, an auto focus area that corresponds to the position of the photographic subjects within the range of photography is displayed in the viewfinder 18, as shown in FIG. 18. In the step S26, the auto focus area that has been displayed in the step S25 is selected as the auto focus area for focus adjustment. And, in the step S27, focus adjustment is performed by matching the focus to the photographic subject within the auto focus area that was selected in the step S26. When this step S27 has been executed, the flow of control is transferred to a step S29.

On the other hand, if the flow of control has been transferred from the step S24 to the step S28, then in this step S28 an arrow sign that indicates the direction of the photographic subject is displayed in the viewfinder 18, as shown in FIG. 19 or FIG. 20, in a similar manner to the step S12 of FIG. 16. When this step S28 has been executed, the flow of control proceeds to the step S29, similarly to the case after the execution of the step S27.

In the steps S29, S30, and S31, similar processing is performed to that of the steps S13 through S15 of FIG. 16. In other words, in the step S29, a decision is made as to whether or not the shutter button has been pressed by the photographer, and if the shutter button has been pressed then photographic processing is performed in the step S30, and in the step S31 the photographed image that has been acquired is recorded upon the memory card 16. But if, in the step S29, the shutter button has not been pressed for greater than or equal to a predetermined time period, then these processing steps are not executed. Subsequently the flow of control returns to the step S22, and the processing described above is repeated.

According to the third embodiment as explained above, in addition to the advantageous operational effects of the second embodiment that have been explained above, the following further advantageous operational effects may be obtained.

(1) The infrared signal that is transmitted as intrinsic identification information from the infrared radiation transmitter 201 held by the photographic subject is received (in the step S22) by the infrared radiation reception unit of the camera 202, and the direction of the photographic subject is obtained as the relative position of the photographic subject with respect to the camera 202, on the basis of the infrared signal that has been received and the direction in which it has been received (in the step S23). Since this is done, it is possible to obtain the position information for the photographic subject, which is to be supplied to the photographer, with a simple system and at low cost.

It should be understood that, in the third embodiment explained above, it is arranged to detect the direction of the photographic subject with respect to the camera 202 by transmitting an infrared signal from the infrared radiation transmitter 201 that is held by the photographic subject, and by receiving this infrared signal with the camera 202. However, it would also be possible to utilize some signal other than an infrared signal, such as, for example, a signal carried by radio waves or laser light, ultrasonic waves, or the like. Any type of signal would be acceptable, provided that the camera is able to detect from what direction that signal has been transmitted.

Moreover while, in the embodiments described above, examples have been explained of photography support systems that support photography when, in a facility such as a kindergarten, a nursery school, elementary school, or the like, a parent at an even such as a sports meeting or the like becomes a photographer and photographs his own child, the present invention can also be applied in other circumstances. For example, the present invention may also be employed when a photographer is photographing some photographic subject who is not his own child, and can also be employed in various types of facility such as a park, a sports hall, an amusement park, a tourist facility or the like. Various modes other than these may also be envisaged.

Although, in the embodiments described above, it is arranged for the cameras that are used to be all of one type, it would also be acceptable to arrange for it to be possible to utilize various types of cameras that have different functions. For example, it may be arranged for it to be possible to utilize a camera that does not display the position of the photographic subject if the photographic subject is within the range of photography and that displays the direction of the photographic subject only when the photographic subject is outside the range of photography, and a camera that displays the position or the direction of the photographic subject not in a viewfinder but on a liquid crystal display, and the like, simultaneously. It should be understood that, if this is done with the second embodiment, then sometimes the information that needs to be received from the control device 104 can be different for different types of camera. In this case, a common set of information may be transmitted from the control device 104 to all of the various types of cameras, and each camera may utilize only the information that is relevant to itself, by selectively choosing from among this information.

The various embodiments and variant embodiments explained above are only examples; the present invention is not limited to the details thereof, provided that its characteristics are not spoiled.

The contents of the disclosures of the following priority applications are incorporated herein by reference:

Japanese Patent Application No. 2006-238977 (filed on Sep. 4, 2006);
Japanese Patent Application No. 2006-238978 (filed on Sep. 4, 2006);
Japanese Patent Application No. 2006-238979 (filed on Sep. 4, 2006); and
Japanese Patent Application No. 2006-241579 (filed on Sep. 6, 2006).

The invention claimed is:

1. A photography support system, comprising:
a plurality of transmission units, respectively held by a photographic subject and one or two or more photographers, each of which transmits intrinsic identification information;
a plurality of reception units, each of which is installed in a facility, receiving the intrinsic identification information transmitted from the plurality of transmission units;
a camera carried by the photographer for photographing the photographic subject;
a photographic subject position identification unit that identifies a position of the photographic subject in the facility, on the basis of the identification information transmitted from at least one of the plurality of transmission units held by the photographic subject and received by one of the plurality of reception units, and the installation position of the reception unit that has received the intrinsic identification information;
a camera position identification unit that identifies a position of the camera in the facility, on the basis of the intrinsic identification information transmitted from the transmission unit held by the photographer and received by the reception unit, and the installation position of the reception unit that has received the intrinsic identification information; and
a relative position calculation unit that obtains a direction to the photographic subject from the camera and a distance to the photographic subject from the camera, on the basis of the position of the photographic subject identified by the photographic subject position identification unit, and the position of the camera identified by the camera position identification unit, wherein
the camera displays matched auto focus areas which match to the position of the photographic subject and overlap an image of the photographic subject;
the camera calculates the distance to the photographic subject from the camera for the matched auto focus areas and performs focus adjustment upon the photographic subject;
the camera makes a decision whether the photographic subject is present in the matched auto focus areas by estimating a difference between the distance to the photographic subject from the camera that was calculated during the focus adjustment and the distance to the photographic subject from the camera that was obtained by the relative position calculation unit.

2. A photography support system according to claim 1, wherein
the camera decides whether the photographic subject is within a range of photography,
if the photographic subject is not within the range of photography, the camera displays the direction to the photographic subject with respect to the range of photography.

3. A photography support system according to claim 2, wherein
the direction to the photographic subject with respect to the range of photography is a sign in the viewfinder that indicates the direction to the photographic subject with respect to the range of photography.

4. A photography support system according to claim 1, wherein,
when displaying the direction of the photographic subject, the camera changes over between vertical and horizontal display, according to the orientation in which the photographer is holding the camera.

5. A camera used in a photography support system according to claim 1.

6. A photography support system according to claim 2, wherein,
the camera performs focus adjustment on the basis of the distance to the photographic subject from the camera that was obtained by the relative position calculation unit.

* * * * *